(12) United States Patent
Silva et al.

(10) Patent No.: US 10,201,816 B2
(45) Date of Patent: Feb. 12, 2019

(54) METHODS, DEVICES, SYSTEMS AND PROCESSES FOR UPGRADING IRON OXIDE CONCENTRATES USING REVERSE FLOTATION OF SILICA AT A NATURAL PH

(71) Applicant: MagGlobal, LLC, Grand Rapids, MN (US)

(72) Inventors: Ronney Rogerio Rodriguez Silva, Grand Rapids, MN (US); Jonathan Sgarlata, Grand Rapids, MN (US); Justin Carlson, Grand Rapids, MN (US)

(73) Assignee: MagGlobal, LLC, Grand Rapids, MN (US)

( * ) Notice: Subject to any disclaimer, the term of this patent is extended or adjusted under 35 U.S.C. 154(b) by 117 days.

(21) Appl. No.: 15/341,643

(22) Filed: Nov. 2, 2016

(65) Prior Publication Data

US 2017/0120258 A1 May 4, 2017

Related U.S. Application Data

(60) Provisional application No. 62/250,455, filed on Nov. 3, 2015.

(51) Int. Cl.
*B03D 1/02* (2006.01)
*B03D 1/004* (2006.01)
(Continued)

(52) U.S. Cl.
CPC ........... *B03D 1/02* (2013.01); *B01D 21/0084* (2013.01); *B01D 21/01* (2013.01); *B01D 21/305* (2013.01);
(Continued)

(58) Field of Classification Search
CPC .. B01D 21/0084; B01D 21/305; B01D 21/01; C01G 49/02; B03D 1/004; B03D 1/02; B03D 2203/02; B03D 2201/06; B03D 2201/04; B03D 2203/04; B03D 2201/02; B03D 2201/007
See application file for complete search history.

(56) References Cited

U.S. PATENT DOCUMENTS 2,290,128 A 7/1942 Loder et al.
4,132,635 A 1/1979 Yang et al.
(Continued)

FOREIGN PATENT DOCUMENTS

CA 2581992 A1 9/2008
WO 2014/179134 A1 11/2014

OTHER PUBLICATIONS

United States Patent Office; International Search Report and Written Opinion of the International Searching Authority in International Application No. PCT/US2016/060091; dated Jan. 31, 2017; Alexandria, Virginia, U.S.
(Continued)

*Primary Examiner* — Daniel McCracken
(74) *Attorney, Agent, or Firm* — Taft Stettinius & Holliser LLP

(57) ABSTRACT

Cationic reverse flotation methods, systems, and processes for producing a marketable iron oxide concentrate from an iron oxide mineral slurry ("treatment slurry"), wherein the iron oxide content of the concentrate is greater than the iron oxide content of the treatment slurry, include introducing the treatment slurry into a flotation cell, together with a collector, a frother and optionally an iron oxide depressant, and recovering two flow streams from the flotation cell, namely a froth fraction (also referred to as a flotation tail fraction) and a sink material fraction (also referred to as the flotation concentrate), wherein the treatment slurry in the flotation cell is maintained at a Natural pH.

11 Claims, 22 Drawing Sheets

(51) Int. Cl.
  *C01G 49/02*     (2006.01)
  *B01D 21/00*     (2006.01)
  *B01D 21/30*     (2006.01)
  *B01D 21/01*     (2006.01)

(52) U.S. Cl.
  CPC .............. *B03D 1/004* (2013.01); *C01G 49/02* (2013.01); *B03D 2201/007* (2013.01); *B03D 2201/02* (2013.01); *B03D 2201/04* (2013.01); *B03D 2201/06* (2013.01); *B03D 2203/02* (2013.01); *B03D 2203/04* (2013.01)

(56) References Cited

U.S. PATENT DOCUMENTS

| | | |
|---|---|---|
| 4,568,454 A | 2/1986 | Mehrotra et al. |
| 5,307,938 A | 5/1994 | Lillmars |
| 2015/0174588 A1 | 6/2015 | Danyliw et al. |
| 2015/0196926 A1 | 7/2015 | Moreira Da Costa et al. |

OTHER PUBLICATIONS

"Remarks in Response to Written Opinion of the International Searching Authority" and "Letter in Support of Claim Amendments Under Article 34" filed in International Application No. PCT/US2016/060091; dated Sep. 2, 2017; 19 Pages.

United States Patent Office; International Preliminary Report on Patentability issued in PCT/US2016/060091; dated Feb. 22, 2018; 18 pages.

Fisher-White, et al., "Phosphorous Removal from Iron Ore with a Low Temperature Heat Treatment," Iron Ore Conference, Perth, WA, Jul. 27-29, 2009, pp. 249-254.

METHODS, DEVICES, SYSTEMS AND PROCESSES FOR UPGRADING IRON OXIDE CONCENTRATES USING REVERSE FLOTATION OF SILICA AT A NATURAL PH

CROSS-REFERENCE TO RELATED APPLICATIONS

This application is a non-provisional application of U.S. Provisional Patent Application No. 62/250,455, filed Nov. 3, 2015, and entitled "Methods, Devices, Systems and Processes for Upgrading Iron Oxide Concentrates Using Reverse Flotation of Silica at a Natural pH," the disclosure of which is expressly incorporated in its entirety herein by this reference.

BACKGROUND

There is an ongoing demand for commodities in developed economies and growing demand in developing countries as a result of the industrial revolution and urbanization occurring in China, India and other countries globally. This demand leads to global exploration and development of economic concentrations of a wide variety of minerals and elements including but not limited to iron oxides for use in iron and steel making. Occurrences of iron oxides, whether present in their natural state or in tailings of prior mining or mineral processing operations, can be economically recoverable if low cost mineral processing systems, such as those based upon surface chemistry properties and magnetic properties of minerals, are developed that can isolate the iron oxides into commercially valuable concentrations. The efficient recovery of weakly magnetic or paramagnetic particles from assemblages of magnetic and non-magnetic particles would make many mineral and elemental occurrences around the planet economically viable as sources of iron, particularly if the concentration of gangue minerals such as silicon dioxide or silica can be reduced to levels below five percent (5.0%) by weight. Of particular economic interest are concentrations of iron that occur naturally in certain rock and mineral formations around the planet and iron concentrations that result from the creation of reject tailings deposition basins or lean ore stockpiles resulting from past mining and mineral processing operations. These tailings basins and stockpiles represent a collection of elements in a form that already has considerable energy, manpower and "carbon footprint" invested into the mining and size reduction of the rock involved and therefore such occurrences have even greater economic and environmental attraction in the ongoing search for low cost commodities and concerns regarding environmental impacts and climate change. However, to date mineral processing systems that can cost effectively and with nominal environmental impact isolate iron oxides from gangue minerals and selectively concentrate the iron mineral assemblages such that gangue minerals such as silica are reduced to levels below 5% by weight are needed.

Processes in the prior art for refining hematite by silica removal from near final concentrates typically have operated at pH levels above 9.0 and usually above 10.0. Achieving these high pH levels requires expensive reagents and conditioners and the use of the necessary reagents and conditioners can negatively impact the environment where such processes are performed. There is an ongoing need, therefore, for advancements relating to the recovery of iron oxide concentrates and, in particular, for reducing the silica content of such concentrates. The present application addresses this need and describes methods, systems and processes that achieve significant silica removal while maintaining high iron recoveries from iron oxide-containing slurries while operating at significantly lower pH, consuming less expensive reagents, reducing costs, and consequently having less negative environmental impacts than processes employed in the prior art. As a result, the methods, systems and processes described herein are significantly more likely to be widely accepted and significantly more likely to be granted permits from regulatory authorities.

SUMMARY

Disclosed herein are methods, devices systems, and processes to upgrade iron oxide concentrates with respect to silica content to levels below 5.0% (by weight percentage) by use of reverse flotation processes where the gangue mineral silica is floated to the froth. The disclosed flotation processes are particularly useful to refine concentrates composed predominantly, but not exclusively, of the iron minerals hematite, goethite (iron oxyhydroxides), and limonite, by the flotation removal of gangue minerals primarily, but not exclusively, including silica and alumina. Other minerals can be treated with the disclosed flotation processes including but not limited to magnetite, maghemite, siderite, fayalite, itaberites, and specular hematite.

In one aspect of the disclosure, a method to upgrade iron oxide concentrates includes monitoring and controlling the pH of flotation steps to a target pH range. In one embodiment, the target pH range is the "Natural pH" of a given mineral assemblage, as described further herein. In one embodiment, the Natural pH of a mineral assemblage is within a range of 8.0 and 8.5, and the target pH of the mineral assemblage for flotation as disclosed herein is a pH of 8.0 to 8.5. In another embodiment, the Natural pH of a mineral assemblage is about 8.2, and the target pH of the mineral assemblage for flotation as disclosed herein is a pH of about 8.2.

In one form, a method for processing a treatment slurry stream includes: (i) introducing into a first flotation cell a treatment slurry stream, the treatment slurry comprising a mineral assemblage that includes a first concentration of silica and a second concentration of at least one iron oxide; (ii) metering into a feed system to the first flotation cell a collector and a frother; (iii) recovering a froth fraction from the first flotation cell; and (iv) recovering a sink material fraction from the first flotation cell. The treatment slurry in the first flotation cell is maintained at a target pH of from 8.0 to 8.5. The sink material recovered from the first flotation cell has a silica concentration lower than the first concentration and an iron oxide concentrate having an iron concentration greater than the second concentration. In one embodiment, the collector comprises an amine, a diamine or a combination thereof. The collector can be metered into the feed to the first flotation cell at a rate sufficient to maintain the treatment slurry at the target pH. In another embodiment, the frother comprises methyl isobutyl carbinol ("MIBC"). In yet another embodiment, the method further includes metering a basic reagent into the first flotation cell at a rate sufficient to maintain the treatment slurry at the target pH. The basic reagent can be, for example sodium hydroxide, commonly known as caustic.

In another embodiment the method includes conditioning the treatment slurry before introducing the treatment slurry stream into the first flotation cell. The conditioning can include, for example, mixing an iron oxide depressant into the treatment slurry. In one embodiment, the depressant comprises starch. In another embodiment the starch is one that has been heat treated to activate its selective depressant properties. In yet another embodiment, the starch is made by digesting or gelatinizing starch using a caustic and mixing the gelatinized or soluble starch into the treatment slurry to provide a mixture having a pH greater than 8.5. The caustic can be, for example, a 10% sodium hydroxide and water solution made by dilution from a 50% concentrate NaOH strength as purchased. In yet another embodiment, the method further includes, before introducing the treatment slurry stream into the first flotation cell, reducing the pH of the mixture to the target pH. In alternate embodiments, the pH of the mixture can be reduced to the target pH by metering an acid into the treatment slurry stream or by injecting carbon dioxide into the treatment slurry.

In another embodiment, the method further includes introducing one of the froth fraction or the sink material fraction into a second flotation cell. In yet another embodiment, the method further includes introducing the froth fraction into a second flotation cell and introducing the sink material into a third flotation cell. The present disclosure contemplates that the method can be further modified by operably connecting more than two flotation cells to further process the froth fractions and/or the sink material fractions of any number of flotation cells in additional flotation cells to achieve a final concentrate that has desired concentrations of iron oxides and/or desired concentrations of silica impurities. Further processing of a sink material fraction recovered from a flotation cell is generally referred to herein as an "upgrading" process. Further processing of a froth fraction taken from a flotation cell is generally referred to herein as a "scavenging" process. As indicated above, any number of upgrading or scavenging steps can be employed in a method, device, system or process described herein to achieve desired results, several non-limiting examples of which are described herein. In one embodiment, in a system that includes multiple flotation cells, including, for example, a system that includes multiple flotation stages and multiple cells per stage, the last upgrading flotation cell produces the final concentrate and the last scavenging cell produces the final tail, with all other froth fractions and sink material fractions being introduced into a subsequent scavenging flotation cell or upgrading flotation cell, respectively. Sink material fractions from scavenging flotation cells are returned to combine with feed materials in one or more upgrading cells. The froth materials from upgrading cells can report to one or more scavenging cells.

In another aspect, the present disclosure provides methods and techniques to determine the Natural pH of a mineral assemblage for use in a flotation method, device, system or process as disclosed herein. The Natural pH can be determined for a given mineral assemblage and mineral processing flowsheet that produces a high iron concentrate, but that still needs further refinement to remove additional silica, thereby making the iron concentrate more suitable for pelletizing and reduction in a blast furnace. The pH of a particular mineral assemblage slurry is dependent on a series of factors including water quality components, surface charge properties, the minerals present in the ore plus the unique characteristics of a given minerals processing flowsheet. The collector and frother added to a mineral assemblage slurry for flotation processing also interact with the slurry system, acting on the surface of mineral particles and air/liquid interfaces and altering the pH of the treatment slurry fed to flotation. The pH of the slurry will rise depending on the dosages of the collector and frother and initial pH before their addition. Natural pH for optimum results flotation is determined using well known design of experiment (DOE) methods and software that utilize a large data set, and is a function of the number of variables studied. In one preferred manner of determining Natural pH, several mineral assemblage slurry samples are collected from a given mineral processing system at different times to represent the ore variabilities. The variables to be flexed for the experimental set include but are not limited to pH, collector type and dosage, frother type and dosage, and starch type and dosage. A typical DOE using an optimal response surface model with the variables describe above requires 74 runs. After the DOE is analyzed and the optimization mode is run, a new set of tests is performed using the parameters obtained to optimize the iron recovery and concentrate grades to validate the DOE. A single test run involves a micro flotation lab test commonly known to those skilled in the art followed by conventional laboratory mineral and elemental analysis of the froth and sink concentrate for at least silica and iron content.

The disclosed flotation processes, devices, systems, and methods can be used to process a wide variety of treatment slurries. The mineral assemblages can be assemblages that result from mining, manufacturing, mineral processing, or other treatment processes or systems. The mineral assemblages can also be mineral assemblages that are extracted for treatment from their natural state in rock formations or left behind mineral collections or stockpiles. The mineral assemblages to be treated may include iron oxide from taconite processing operations; iron oxides left behind from natural iron ore wash or heavy media processing plants; iron oxide stockpiles or impoundment basins containing concentrations of hematite, silica, magnetite, goethite, limonite, siderite, fayalite, maghemite, martite, ilmenite, itaberites, and/or alumina and other minor minerals; iron formations including concentrations of hematite, goethite, magnetite, silica and other minor minerals.

In one embodiment, the treatment slurry is an iron ore concentrate slurry produced by prior separation processes, such as size screening and/or magnetic separation processes, from a variety of feed stocks. For example, the prior separation processes can include the use of wet high intensity electro-magnetic separators (WHIMS) to act as cobbers or first stage magnetic separators acting upon weakly or paramagnetic minerals to concentrate them with respect to iron and the use of WHIMS to scavenge iron oxides such as hematite and hydrated iron oxides such as goethite that are not recovered in primary recovery circuits including for example density or specific gravity based recovery circuits such as heavy media separators, Humphrey spirals, jig tables, centrifugal jigs; and/or low intensity magnetic separations circuits (LIMS) that use permanent ferrite magnets, or medium intensity magnetic separator circuits (MIMS) that use permanent ferrite magnets and/or rare earth magnets. The treatment slurry can also be produced using processes to prepare, and concentrate with respect to iron oxide content, mineral assemblages by screening, size sorting, and size reduction by wet ball milling circuits closed with size classification equipment preceded by wet high intensity electro-magnet separators or WHIMS as first stage (cobber), and followed by second stage WHIMS (roughers), third stage WHIMS (finishers), fourth stage WHIMS (cleaners), backed up by one or more scavenger WHIMS magnetic separators that treat the rejects from the rougher, finisher or cleaner WHIMS units. In one embodiment, the WHIMS units receiving material processed by the ball mill circuit are preceded by protective systems to remove strongly magnetic materials such as grinding media, or magnetite and also recover and generate coarse liberated hematite and reject to tailings slimes (particles smaller than 6 microns) using a class of medium intensity wet magnetic separators using ferrite and or rare earth magnets with at least 5000 gauss magnets together with other widely known and available mineral processing equipments such as for example sumps, tanks, pumps, pipelines, agitated slurry tanks, flow and density instrumentation and control systems, and other mineral processing steps. In various alternative embodiments, the process for preparing a treatment slurry can employ grizzly screens to remove debris, rocks, frost chunks, wood, and other foreign matter; primary screens to remove smaller debris and that slurrify the undersize product into a water based pumpable slurry; slurry pumps, slurry storage tanks and agitators, hydro-cyclones, medium intensity magnetic separators (MIMS), WHIMS, jigs, spirals, wet high frequency fine screens, hydro-cyclones, pipelines, sumps, vacuum pumps and vacuum filters, thickeners, and conveyors.

In one embodiment, the treatment slurry for processing in a disclosed flotation method, process, device and/or system is a high iron mineral assemblage, such as, for example, an iron-containing mineral assemblage where the iron content has been concentrated by commonly known mineral beneficiation methods and processes or where the iron concentration has been achieved naturally by geologic processes over time to iron concentrations in excess of 60% iron measured by weight. Such high iron mineral assemblages usually contain most of the iron in the form of oxides of iron although iron carbonates and sulfates and other minor iron minerals may also be present. There exists in nature sixteen iron oxide or oxyhydroxides of iron. Commercially, the most important iron oxides to the iron and steel making industries are hematite, maghemite, magnetite, wustite, martite, goethite, and limonite. One example of an iron ore concentrate with which the disclosed flotation methods, devices, systems and/or processes can be employed is composed primarily of hematite, goethite, and limonite with minor amounts of magnetite. Iron oxide concentrates which are finely divided particulate assemblages of hematite, magnetite, goethite, and or limonite are also known as concentrates, iron ore concentrate, filter cake, iron ore fines or pellet feed. The present disclosure provides methods, processes, devices and systems to treat such iron ores so as to create concentrates with merchantable concentrations of iron oxides that can be agglomerated for subsequent reduction into pig iron by various iron making methods such as by processing in blast furnaces or other iron smelting or reduction processes.

The methods, devices, systems and processes disclosed herein are operable to treat certain mineral assemblages in such a fashion so as to separate certain valuable elements and/or minerals from less valuable minerals or elements and refine such iron oxide concentrations so as to reduce the chief gangue mineral, silica to a concentration by weight of less than five percent.

Further embodiments, forms, features, aspects, benefits, objects and advantages of the present invention will become apparent from the detailed description and figures provided herewith.

DETAILED DESCRIPTION

Figure 1:
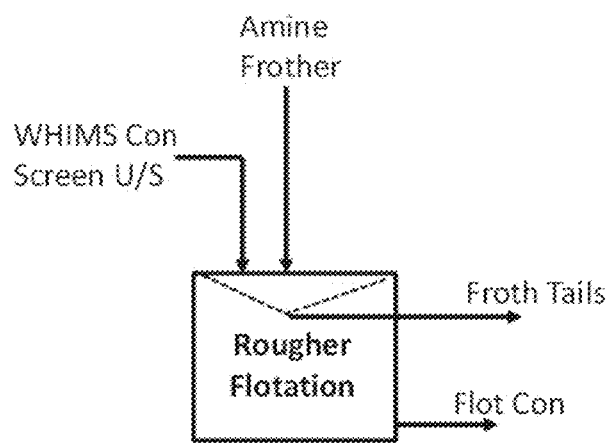
FIG. 1 is a flow diagram of a process according to one embodiment of the disclosure.

For the purposes of promoting an understanding of the principles of the invention, reference will now be made to the embodiments illustrated in the figures and specific language will be used to describe the same. It will nevertheless be understood that no limitation of the scope of the invention is thereby intended. Any such alterations and further modifications in the described devices, systems, processes and methods, and such further applications of the principles of the invention as described herein are contemplated as would normally occur to one skilled in the art to which the present application relates.

The present application provides devices, systems, methods and processes to treat mineral assemblages to remove silica gangue materials therefrom. In one embodiment, a mineral assemblage treated as described herein is composed mainly of hematite and hydrated iron oxide minerals such as goethite and limonite. In another embodiment, a mineral assemblage treated as described herein includes magnetite.

In one aspect of the disclosure, cationic reverse flotation methods, systems, and processes for producing a marketable iron oxide concentrate from an iron oxide mineral slurry ("treatment slurry"), wherein the iron oxide content of the concentrate is greater than the iron oxide content of the treatment slurry, include introducing the treatment slurry into a flotation cell, together with a collector, a frother and optionally an iron oxide depressant, and recovering two flow streams from the flotation cell, namely a froth fraction (also referred to as a flotation tail fraction) and a sink material fraction (also referred to as the flotation concentrate), wherein the treatment slurry in the flotation cell is maintained at a Natural pH. In one embodiment, the Natural pH is provided by conditioning the treatment slurry prior to introduction of the conditioned treatment slurry into the flotation cell. In one embodiment the treatment slurry is conditioned by introducing into the treatment slurry a collector and an iron oxide depressant comprising a pre-digested corn starch depressant to provide a mixture. In one embodiment the pre-digested corn starch depressant is prepared by digesting corn starch with caustic soda at ambient temperature and the method further includes injecting carbon dioxide gas into the mixture to lower the pH of the conditioned treatment slurry. In the flotation cell, the treatment slurry is refined by reverse flotation, whereby gangue mineral silica is removed from the treatment slurry by reverse flotation. In other embodiments, multiple flotation processing steps, including, for example, combinations of primary flotation cells coupled with cleaner and/or scavenger flotation cells are included, all deploying the starch depressant and Natural pH control by $CO_2$ injection.

The treatment slurry introduced into a flotation cell as described herein can be made by one or more of various unit processes including screening, slurrification with water, wet grinding for primary mineral liberation, WHIMS cobbing, MIMS roughing, MIMS finishing and/or MIMS cleaning, WHIMS scavenging of the MIMS rejects coupled with secondary regrinding of such reject concentrates for additional mineral liberation, and additional WHIMS upgrading steps.

In one aspect of the disclosure, a flotation method for processing a treatment slurry stream includes: introducing into a flotation cell a treatment slurry stream, the treatment slurry comprising a mineral assemblage that includes a first concentration of silica and a second concentration of at least one iron oxide; metering into the feed to the flotation cell a collector and a frother; recovering a froth fraction from the flotation cell; and recovering a sink material fraction from the flotation cell; wherein the treatment slurry in the flotation cell is maintained at a target pH of from 8.0 to 8.5. The sink material recovered from the flotation cell comprises a silica concentration lower than the first concentration and an iron oxide concentrate having an iron concentration greater than the second concentration.

The collector can be any collector known in the art, a variety of which are known by persons of ordinary skill in the art and are commercially available. In one embodiment, the collector is an ether amine, an ether diamine or a combination thereof. In one embodiment, the collector is metered into the feed to the first flotation cell at a rate sufficient to maintain the treatment slurry at the target pH. The frother can be any frother known in the art, a variety of which are known by persons of ordinary skill in the art and are commercially available. In one embodiment, the frother is methyl isobutyl carbinol (MIBC). In another embodiment, the frother is a mixture of aliphatic alcohols, esters and ethers, such as, for example, Montanol™, which is a product commercially available from Clariant International Ltd. (The Woodlands, Tex.). The amount of frother to meter into the feed to the flotation cell can be determined by a person of ordinary skill in the art to achieve a desired amount of frothing in the cell.

Figure 2:
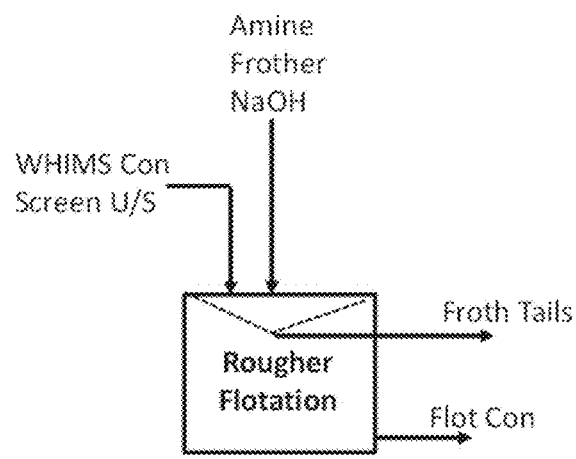
FIG. 2 is a flow diagram of a process according to another embodiment of the disclosure.

A flow diagram of a representative process is set forth in FIG. 1, wherein the treatment slurry is identified as "WHIMS Con Screen U/S", which is only one example of a treatment slurry that can be processed in the flotation cell. The method can also include metering a basic reagent into the first flotation cell at a rate sufficient to maintain the treatment slurry at the target pH. In one embodiment, the basic reagent comprises sodium hydroxide. A flow diagram showing the addition of sodium hydroxide is set forth in FIG. 2.

Figure 3:
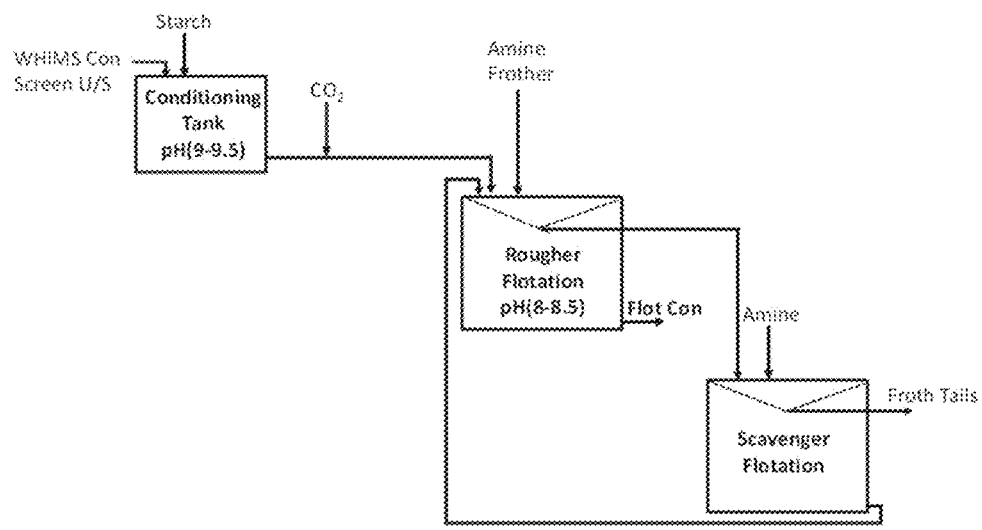
FIG. 3 is a flow diagram of a process according to another embodiment of the disclosure.

In another embodiment, the treatment slurry is conditioned before being introduced into the flotation cell. In one embodiment, the conditioning includes mixing a depressant intended to act upon the iron oxide and iron oxide hydroxide minerals into the treatment slurry. In one embodiment, the iron oxide depressant comprises a starch material. As is understood by a person of ordinary skill in the art, the starch material suitable for use as an iron oxide depressant can be prepared by cooking starch to produce a gelatinized, soluble form of the starch, which can be dispersed in an aqueous slurry. Alternatively, the starch material can be prepared by digesting starch with a caustic, such as, for example, caustic soda. In one embodiment, the starch material employed as the depressant comprises a starch material made by digesting starch using a caustic. In this embodiment, mixing the digested starch into the treatment slurry provides a mixture having a pH greater than 8.5. In this embodiment, the method further includes, before introducing the treatment slurry stream into the flotation cell, reducing the pH of the mixture to the target pH. Reducing the pH of the treatment slurry to the target pH can be achieved, for example, by metering an acid into the treatment slurry stream in an amount effective to lower the pH of the treatment slurry to the target pH. In another embodiment, the pH of the treatment slurry is lowered by injecting $CO_2$ into the treatment slurry. A process diagram showing the addition of starch to a treatment slurry and injection of $CO_2$ is set forth in FIG. 3. This process diagram also depicts a process that employs a second flotation cell, labeled in FIG. 3 as "Scavenger Flotation" to process the froth fraction recovered from the first flotation cell, which is labeled "Rougher Flotation pH (8-8.5) in FIG. 3. FIG. 3 also depicts the optional addition of additional amine collector into the second flotation cell, which can be employed as needed to maintain a desired amount of collector in the cell. A person of ordinary skill in the art will recognize that additional frother also can be introduced into the second flotation cell if needed to achieve a desired amount of frothing.

Figure 4:
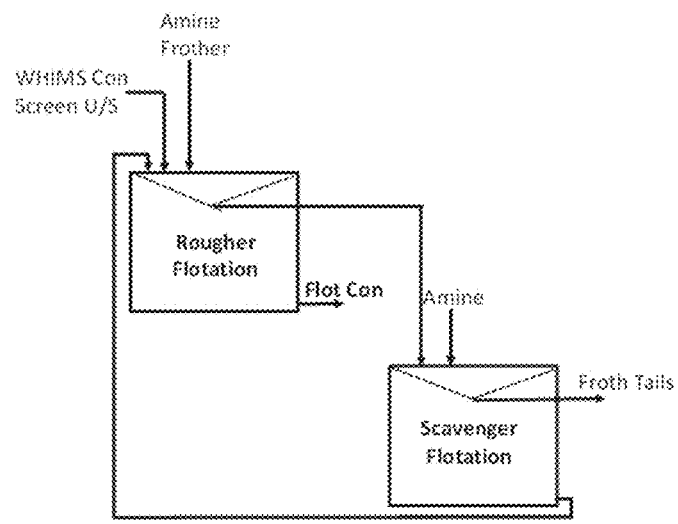
FIG. 4 is a flow diagram of a process according to another embodiment of the disclosure.
Figure 5:
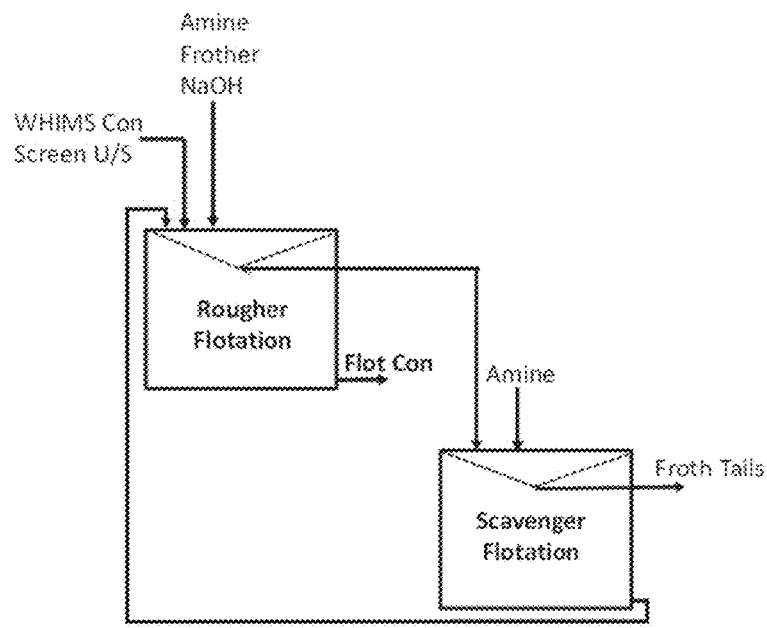
FIG. 5 is a flow diagram of a process according to another embodiment of the disclosure.

A variety of embodiments can be employed based on the basic components described above that can include introducing one or both of the froth fraction and/or the sink material fraction into a second or more flotation cell. In a flotation circuit that includes a second flotation cell as a Scavenger stage, the scavenger feed receives the froth fraction from the first flotation cell, i.e., the Rougher stage. The concentrate from the Scavenger stage returns to the Rougher stage as a further input into the first flotation cell. The final Scavenger froth, whether in a system including two flotation cells or more than two flotation cells, is the final tails. Examples of various embodiments are set forth as FIGS. 4-5.

Figure 6:
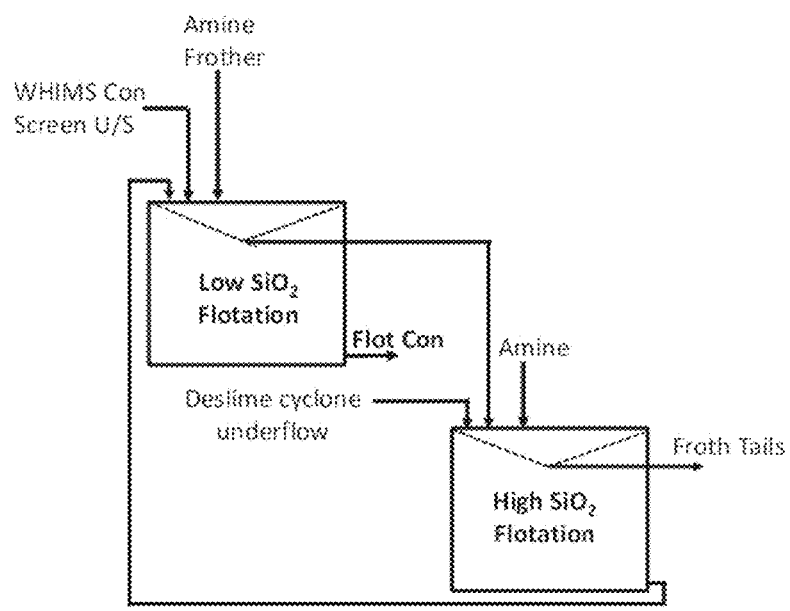
FIG. 6 is a flow diagram of a process according to another embodiment of the disclosure.
Figure 7:
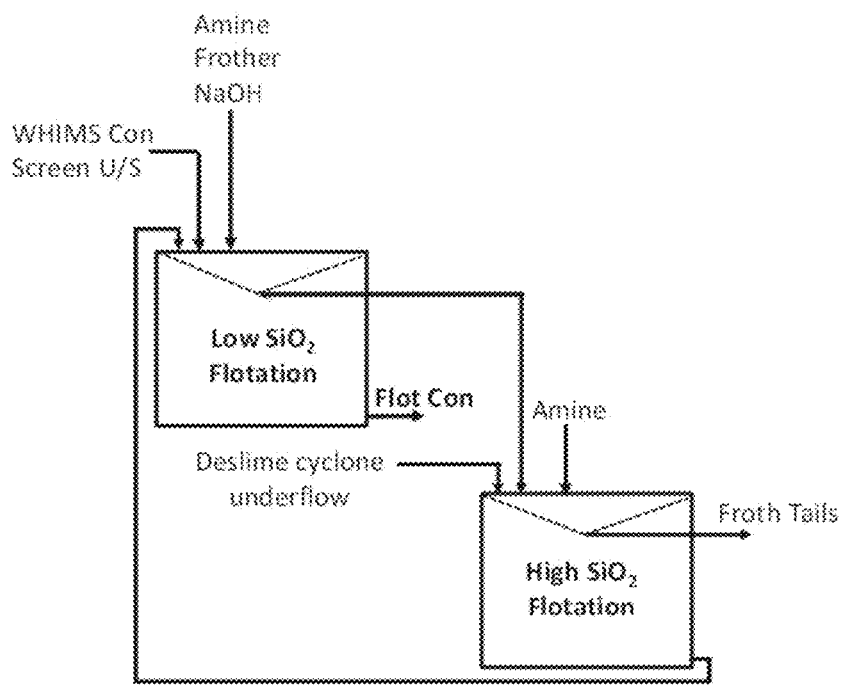
FIG. 7 is a flow diagram of a process according to another embodiment of the disclosure.

A multiple-cell flotation system can also be employed in which a second or subsequent flotation cell not only provides a scavenging function by processing the froth fraction from a prior cell, but also receives additional high silica inputs from prior mineral separation/upgrading processes. Examples of such systems are set forth in FIGS. 6-7, in which the treatment slurry stream labeled "Deslime cyclone underflow" represents a flow stream that has a relatively high silica content compared to the flow stream labeled "WHIMS Con Screen U/S".

Figure 8:
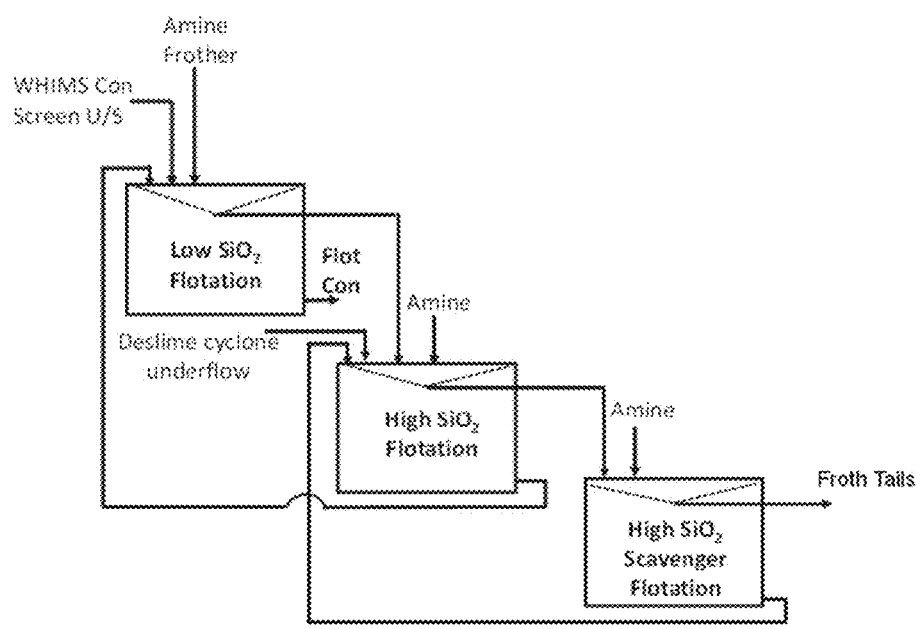
FIG. 8 is a flow diagram of a process according to another embodiment of the disclosure.
Figure 9:
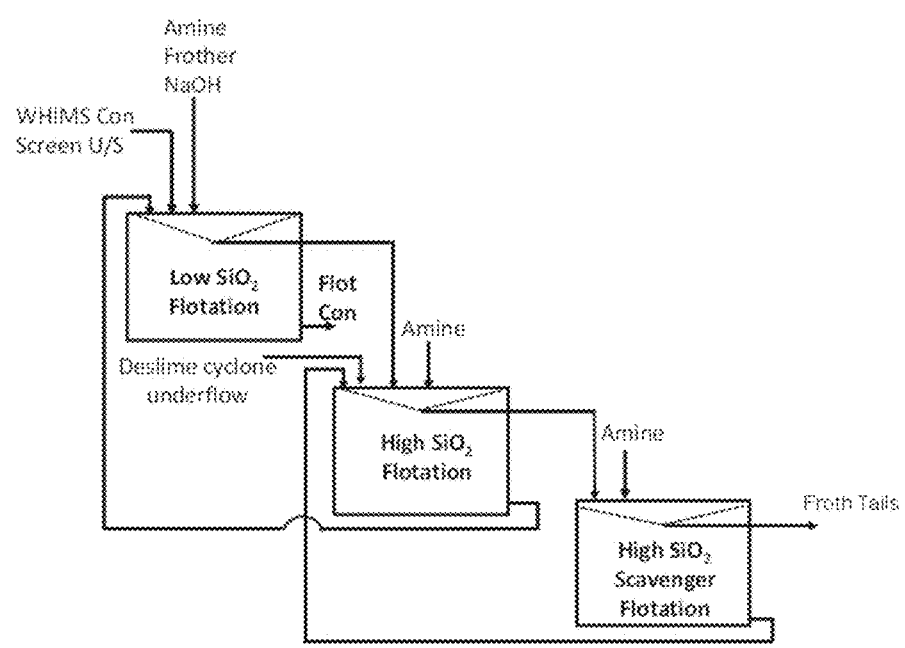
FIG. 9 is a flow diagram of a process according to another embodiment of the disclosure.

FIGS. 8-9 depict systems that include three flotation cells connected in series. As is seen in FIGS. 8-9, the sink material fraction from the first flotation cell in the series is the final concentrate product of the flotation system, while the sink material fractions from all other flotation cells are returned to a prior flotation cell as an additional input for upgrading. In addition, the froth fraction from the last flotation cell in the series is the final tails fraction of the flotation system, while the froth fractions from all other flotation cells are conveyed to a subsequent flotation cell as an additional input for scavenging.

The iron oxide concentrate recovered from the flotation cell can be further processed, if desired, by conventional thickener and vacuum filtering for dewatering to produce a marketable and shippable filter cake. The filter cake can include, for example 10% moisture plus or minus 1-2% by weight.

In one embodiment, the flotation process can be used to treat an iron oxide-containing treatment slurry that includes iron oxide (hematite), iron oxyhydroxide (goethite) and silica to produce a further refined concentrate that includes a lower silica content and a higher hematite and goethite content than the treatment slurry. In one embodiment, the treatment slurry is an iron oxide concentrate recovered from other iron ore upgrading processes, such as, for example, multiple WHIMS upgrading and scavenging circuits. In one embodiment, for example, a treatment slurry that includes about 63% hematite with 27% iron oxyhydroxide (goethite) 8% silica and 2% minor minerals mineral composition is processed as described herein to produce a final concentrate with approximately 4.5% silica, 1-2% minor minerals and the 100% balance being hematite and goethite. The treatment slurry fed to the flotation process described herein can be produced by mineral processing steps applied to left behind mineral assemblages held in tailings basins, stockpiles or contained in ore mined from virgin geologic formations in the earth's crust.

In one embodiment, the reverse flotation described herein (also referred to as a Natural pH Flotation Process™) is used to process a treatment slurry that is produced from a an iron oxide upgrading process that includes WHIMS cobbing of prepared and sized slurries of hematite-goethite-silica assemblages and WHIMS scavenging of rejects from MIMS or gravity circuits. For example, in one embodiment, the iron oxide upgrading process used to produce a treatment slurry is one configured to optimize recovery of western Mesabi Iron Range tailings (left behind from long abandoned mineral processing plants that processed natural iron ores originating in the Biwabik Iron Formation in Minnesota), containing predominantly hematite and goethite with the gangue mineral silica. One such embodiment is set forth in the flowsheet depicted in FIG. 10.

Figure 10:
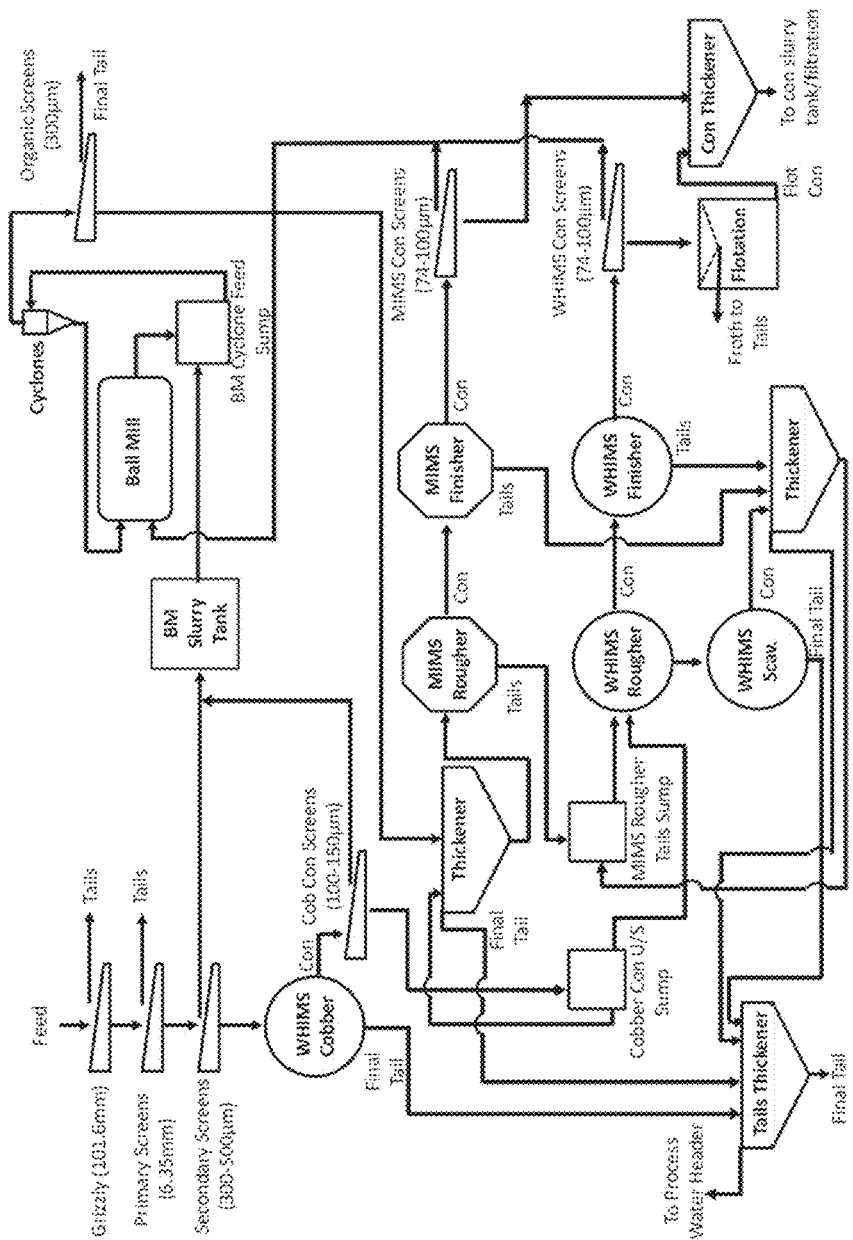
FIG. 10 is a flow diagram of a process according to another embodiment of the disclosure.

The flowsheet of FIG. 10 depicts an embodiment that is able to segregate minerals and particle size distribution. In the first part of the process after being classified (grizzly screening, primary and secondary screens) the oversize ("OS") from the grizzly and primary screens that represents pieces larger than 101.6 mm and 6.35 mm respectively goes to tails, the "OS" (larger than 0.300 mm) fraction from the secondary screens goes to a ball mill circuit closed with with hydrocyclones, the cut size in the hydrocyclones are set up to be 100 µm, then the undersize ("US") fraction (−100 microns) undergoes a pre-concentration step by a WHIMS cobber stage. The non-magnetic fraction from the WHIMS cobber goes to the tails and the cobber concentrate fraction is classified by high frequency screens (such as for example Derrick brand screens). The OS fraction (+100 microns) from the Derrick screens goes to a ball mill circuit, the high frequency screen US fraction (−100 microns) from this size classification goes to a sump. The hydrocyclone overflow ("OF") from the ball mill circuit, which is classified smaller than 100 microns goes to a high frequency screen with a cut size of 300 microns to remove organic material prior to subsequent processing, the OS (+300 micron (mostly organics) goes to tails and US (−300 microns) goes to a Hydro Thickener.

As described above, at this point the circuit can be separated in two stages in terms of liberation and particle size distribution, the range between 6.35 mm to 100 microns presenting a poor liberation is sent to ball mill circuit, the fraction between 300 microns to 100 microns is pre-concentrated before it goes to ball mill, and the ball mill will then grind the particles that range between 6.35 mm to 100 microns (0.100 mm) being able to control the product to a desired liberation. The ball mill product goes to hydro thickener that feeds the medium intensity magnetic separator (MIMS) circuit. The natural fines below 100 microns (0.100 mm) that have a good liberation go to a sump that feeds preferentially the WHIMs circuit but also with flexibility to feed part of the material to the MIMS circuit. At this point another separation is done and the circuit now is divided in terms of mineralogical components in order to maximize its performance. While not shown in FIG. 10, the MIMS circuit can be eliminated or can be substituted with other types of medium or high intensity magnetic separators known in the art, the selection of which is within the purview of a person of ordinary skill in the art, and may be based upon the particle size distribution and mineralogical characteristics of the mineral assemblage to be processed.

The medium intensity magnetic circuit will maximize the coarser hematite and magnetite recoveries, remove strongly magnetic materials such as metallics from grinding ball fragments, siderite, maghemite, or magnetite all of which may foul scavenger WHIMS that process MIMS tailings, and also perform a desliming step. The tails from this stage goes to WHIMs circuit for scavenging of iron bearing minerals with lower magnetic susceptibility. In this way a unique product is produced by the medium intensity magnetic separator stage being essentially Hematite/Magnetite and free from super fines that will be treated in the subsequent process steps.

The WHIMS circuit is basically set up to capture fine particles and hydrate based ores (goethite and limonite), as well as function as a desliming step to separate the US (−20 microns) preparing the material for treatment using cationic reverse flotation as described above. This treatment slurry for the flotation processing is a mix of fine hematite and hydrate based ore (goethite and limonite), which is well suited for flotation at pH of approximately 8.0 (which is referred to herein as a natural slurry pH). This is possible because of minerals feed characteristics having a PZC around 6.3 as discussed further in the Examples below, which correlates with the silica minerals having strongly negative surface charge meanwhile the iron oxides having only weakly negative surface charge. This allows the collector to preferentially attach and float the silica minerals. At pH 8.0 both hematite and quartz are negatively charged, with the quartz strongly negative and hematite weakly negative, which is a condition that favors quartz flotation. Additionally, to give more flexibility to the flotation circuit, it is preferable to add NaOH to adjust the flotation feed pH up to 8.2. Based on the minerals changes in flotation feed, that pH change promotes a better floatability and reduction in collector and frother dosages.

Both concentrates from the medium intensity magnetic separator circuit (MIMS) stage and the flotation process can be combined to produce a final concentrate that can be de-watered by vacuum filtration at the concentrator plants followed by shipment to the pellet plant. According with the proportion of the iron ore bearing minerals described above and/or changes in the particle size distribution feeding the circuit, some alternative embodiments of the enhanced flowsheet can be used to maximize the process recovery, productivity and variety of ores that can be exploited. Those alternative flowsheets and their purposes are described below.

Figure 11:
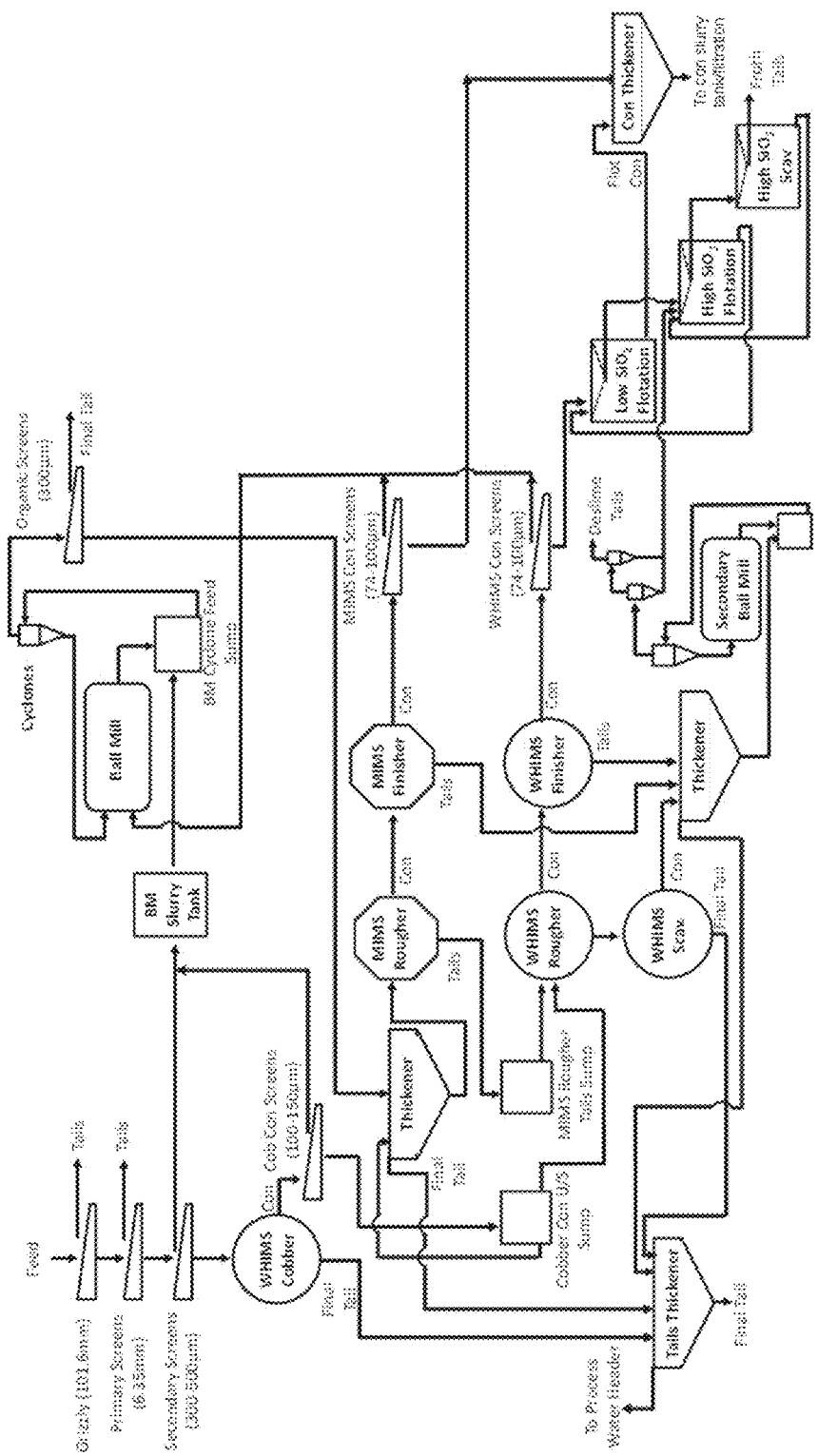
FIG. 11 is a flow diagram of a process according to another embodiment of the disclosure.
Figure 12:
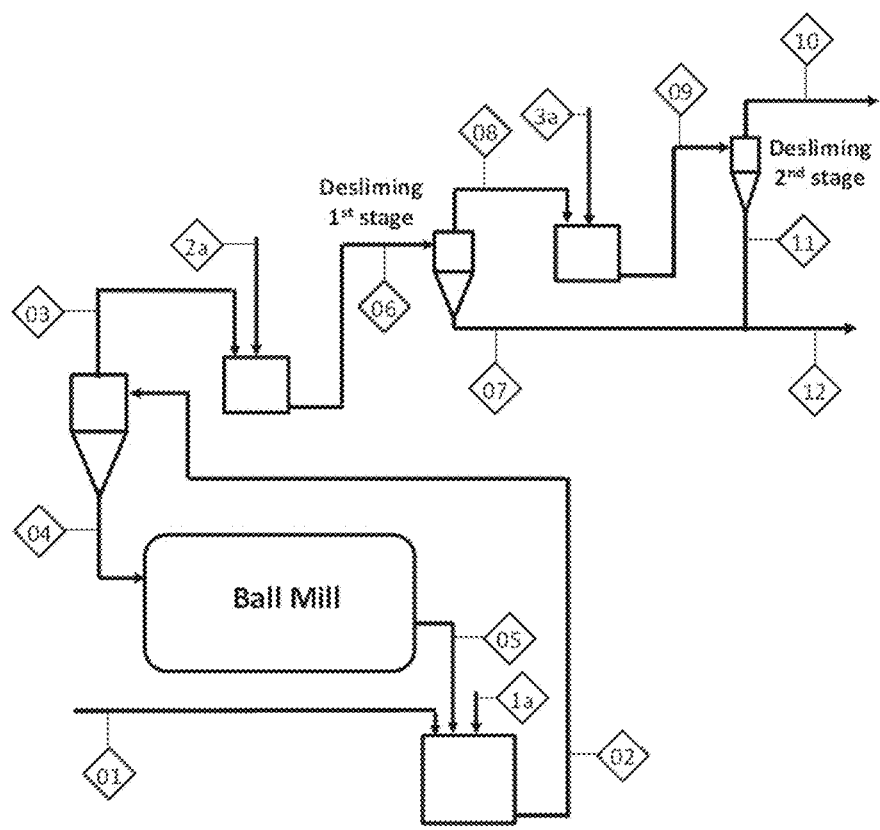
FIG. 12 is a flow diagram of a process according to another embodiment of the disclosure.

Considering feeds with high silica and lower iron oxide mineral contents with poor liberation, in another embodiment the streams of MIMS finisher tails, WHIMs finisher tails and WHIMs scavenger concentrate go to a thickener and the thickener UF is then processed by secondary grinding, desliming and flotation as shown in the FIG. 11. The hydrocyclone in the secondary ball mill circuit can be set up with a cut size of 74 µm, thus the OF (−74 microns) from the hydrocyclone can go to a two stage desliming step using hydrocyclones (FIG. 12). The desliming circuit is set up to remove the ultrafines below 6 microns, which helps to prepare the feed for the flotation processing described herein. It is important to remove most of the ultrafines smaller than 6 microns to prevent the effect of "sliming coating" where the ultra-fines inhibit the flotation performance. The flotation circuit (FIG. 11) can then be separated into low silica and high silica flotation set ups giving much more flexibility to this process with some alternative interchangeable streams between both circuits.

The low silica flotation feed in this embodiment receives the UF (−74 microns to 6 microns) from the desliming circuit stage. Alternatively, before feeding the flotation, it goes to a screen used as protection to the flotation circuit having a cut size of 74 microns, then the US that is below 74 microns feeds the rougher-cleaner stage, and the concentrate from this stage reaching the final concentrate specification goes to join the low silica circuit final concentrate. Alternatively, it can go to the low silica circuit feed. The froth goes to a scavenger circuit with the froth from this scavenger stage becoming a final tails and the concentrate recirculates back to the high silica circuit feed. The froth from the low silica circuit feeds the high silica circuit or all or a part can be the final tails giving much more flexibility to the circuit.

Figure 13:
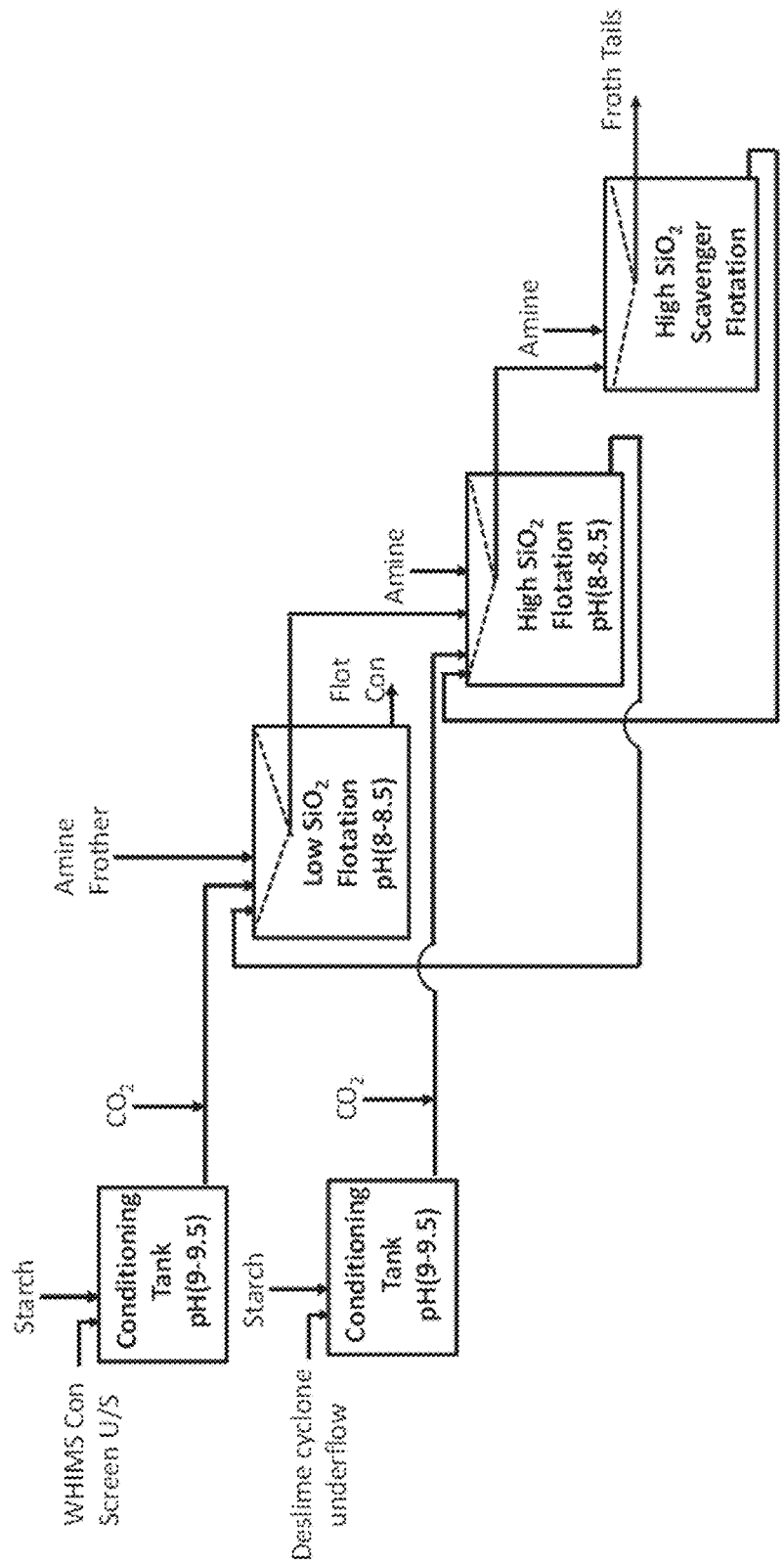
FIG. 13 is a flow diagram of a process according to another embodiment of the disclosure.
Figure 14:
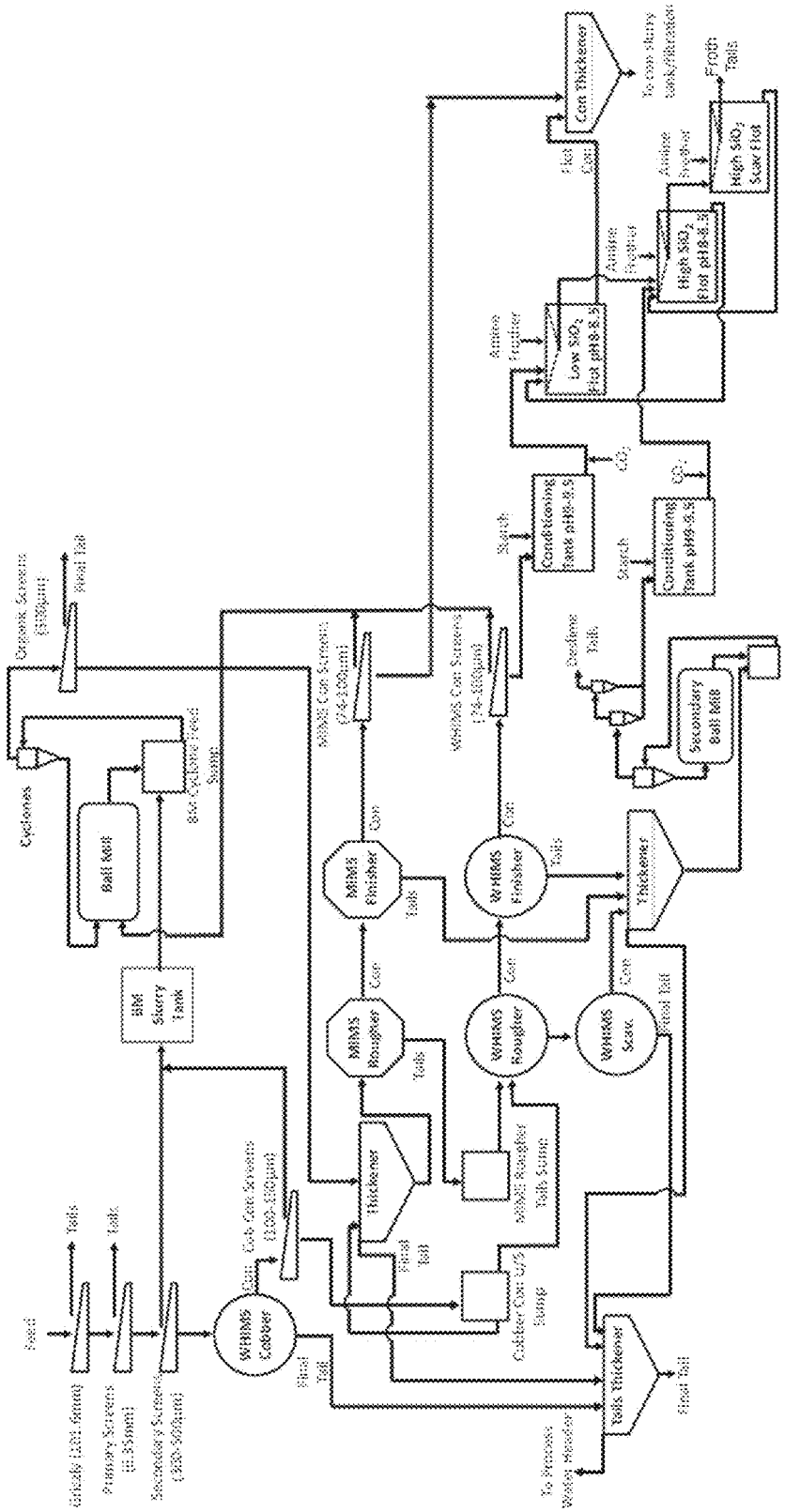
FIG. 14 is a flow diagram of a process according to another embodiment of the disclosure.

In another embodiment, the flotation system is set up to add a depressant reagent (also referred to as a "depressing agent") for the flotation circuit, as shown in FIG. 13. When a depressing agent is used in the cationic reverse flotation process, the depressing agent acts upon the iron minerals and can be a polysaccharide, such as, for example, a starch. The performance of starch type and its effect on the selectivity and efficiency in the flotation was studied by the inventors relative to changes in the pH and the results demonstrate that the use of a starch depressant can have a significant positive effect on iron recovery. The system shown in FIG. 14 includes a combination of a mineral assemblage pre-processing system and a flotation circuit that includes conditioning tanks to mix a starch depressant into the treatment slurry, followed by injection of $CO_2$ into the conditioned treatment slurry.

In one embodiment, after corn starch is converted into a soluble form, it is used as a depressant at a "Natural pH" of 8.2 plus or minus 0.3. The use of starch as described herein increases the iron recovery range by 13% to 18% and decreases the $SiO_2$ in the concentrate to a level of 4.2% to 5%, when flotation is performed at a target pH within a range of 8 to 8.5. Once starch is gelatinized using caustic soda to activate the starch and make it soluble in water, its addition to the treatment slurry will increase the pH to around 9 to 9.5 depending on the dosage added, thus the need for a further modification of the pH to bring the pH of the slurry within the target range. In a preferred embodiment, the pH is regulated using $CO_2$ injection. The use of $CO_2$ in iron ore flotation is well known for processing streams after flotation as thickener feed and filtration, the unique characteristic in this case is the $CO_2$ used to regulate the flotation feed before the flotation action. Between several significant advantages in safety, storage, handling, and cost comparing with other options such as acid addition, the use of $CO_2$ helps to improve flotation performance by also causing a reaction with free $Ca^{2+}$ and $Mg^{2+}$ to neutralize those species which if not done is well known to have deleterious effects on flotation. The neutralization of free calcium and magnesium ions is believed to occur by the reactions shown below.

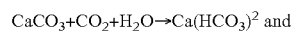

$$CaCO_3+CO_2+H_2O \rightarrow Ca(HCO_3)^2 \text{ and}$$

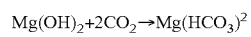

$$Mg(OH)_2+2CO_2 \rightarrow Mg(HCO_3)^2$$

Figure 15:
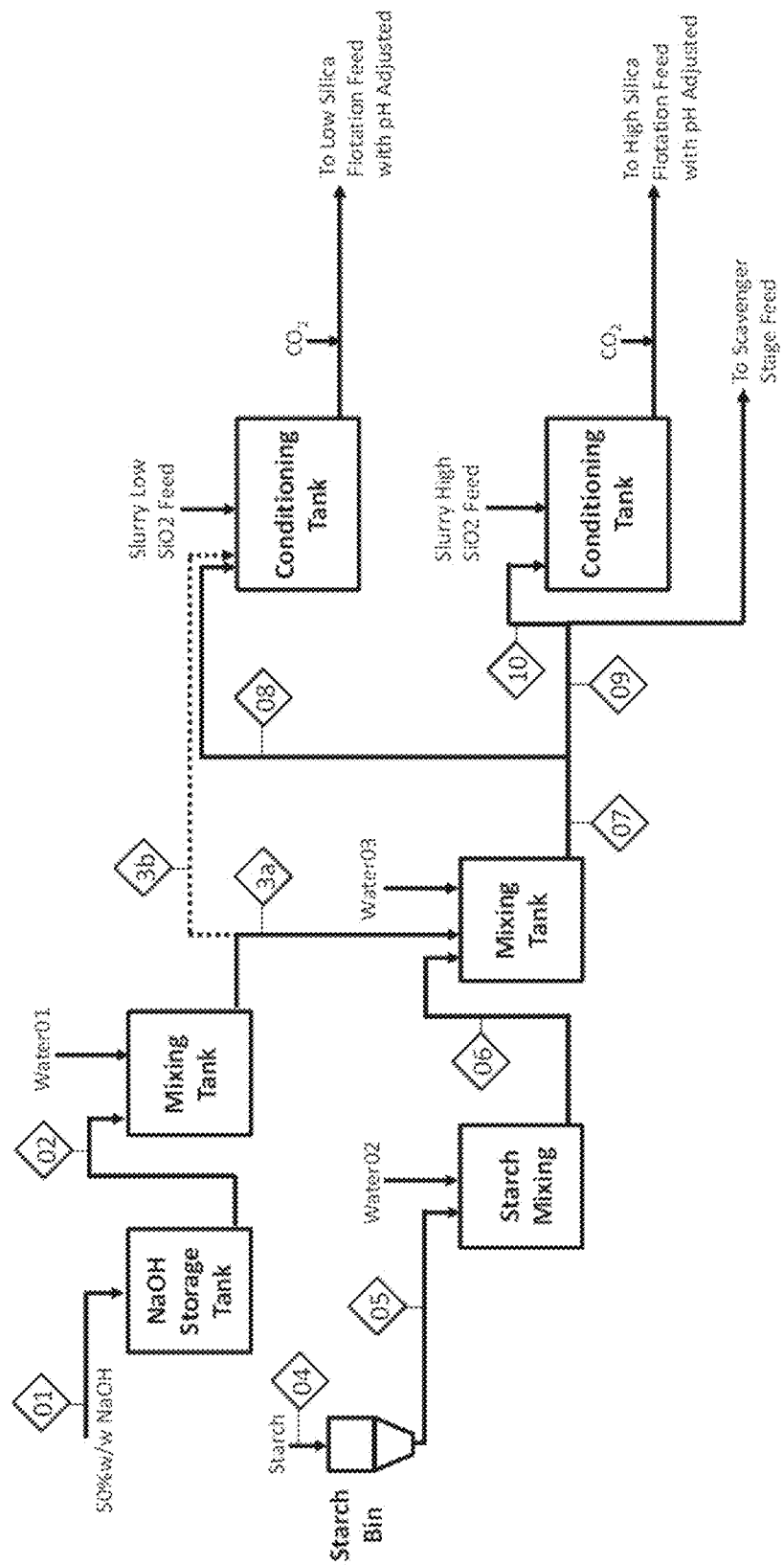
FIG. 15 is a flow diagram of a process according to another embodiment of the disclosure.

The starch flowsheet preparation and addition can be seen in the FIG. 15. The circuit consists of a caustic soda storage tank to receive a solution of 50% w/w and that is pumped to another tank to reduce to 10% w/w solution. On a parallel row the starch storage in super-sacs that is reclaimed through an electrical hoister that feeds a bin with a feeder to a tank to have a 12% w/w solution. The 10% w/w caustic soda and 12% w/w solutions are mixed in a tank where take place the gelatinization process of the starch takes place. The gelatinized starch is pumped to the conditioning tanks before the flotation, $CO_2$ is added after the conditioning tanks, keeping the pH between 8 and 8.5.

Various changes and modifications to the described embodiments described herein will be apparent to those skilled in the art, and such changes and modifications can be made without departing from the spirit and scope of the invention and without diminishing its intended advantages. Additionally, while the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

Examples of Laboratory Testing

Effect of pH in the Flotation Performance
Introduction

In iron ore processing, cationic reverse flotation route is by far the most widely utilized flotation method. Quartz is floated with ether amines (R—(OCH$_2$)$^3$—NH$_2$) partially neutralized with acetic acid. The degree of neutralization is an important parameter. Higher neutralization degrees enhance the collector solubility but impair the flotation performance. In a cationic reverse flotation, the mechanism of interaction between the quartz surface and collector (amine) is electrostatic and it is explained by the electrical double layer. To have the adsorption of the amine to the quartz, both need to have opposite electrical charges. The amine is cationic and as explained by the electrical double layer theory the quartz will be negative charge. At Natural pH (8.3), amine loses its frother properties, which requires use of a specific frother such as MIBC. In this type of flotation the hematite needs to have the surface charged positively or weakly negative. Because the attraction mechanisms between the quartz and collector is electrostatic as explained above, the amine also will adsorb to the hematite depending on the surface charge and strength of it. This study investigates the performance of flotation in different pH.

Methodologies and Procedures

Sample

A composite sample (sample) was collected from an existing concentrate-producing plant (Plant X) flotation feed, in a total of 55 kg.

Sample Characterization

The sample was homogenized and split in bags, each containing around 600 g of sample. The sample was analyzed in terms of particle size distribution and assay by fraction.

Flotation Tests

The flotation tests were done using a 2.5 L cell with 25% solids w/w. The collector used was M100-7, an aliphatic ether amine commercially available from Air Products and Chemicals, Inc. (Allentown, Pa.) and frother MIBC with dosages of 0.4#/t and 0.1#/t respectively. The pH was changed as following: 5, 6, 7, 7.5, 8, 8.5, 9 and 10.

PZC Test

The method of Mular and Roberts was used to determine the values of point of zero charge (PZC) for the feed sample. Suspensions of 2 g of sample in 50 ml of 10-2 M potassium nitrate (KNO$_3$) (in distilled water) were prepared and the pH adjusted using either potassium hydroxide or nitric acid as required. Only one pH regulator was used, as ionic strength is an important consideration in this method.

Results

Feed Characterization

Table I below shows the feed assays. It is important to note that the main contaminant is SiO$_2$. The other contaminates are very low probably because of a good job of the magnetic separation prior to the flotation.

TABLE I

| Fe | SiO2 | CaO | Mn | Al2O3 | MgO | P | S |
|---|---|---|---|---|---|---|---|
| 61.86 | 8.49 | 0.047 | 0.162 | 0.365 | 0.069 | 0.033 | 0 |

| K2O | Na2O | TiO2 | Cu | Ni | Cr | Pb | Zn |
|---|---|---|---|---|---|---|---|
| 0.007 | 0.025 | 0.0486 | 0.0022 | 0.0018 | 0.0034 | 0.0024 | 0.0025 |

Table II below shows the particle size distribution for the feed. As expected, most of the material is below 210 microns. The feed P80 is 58 μm and 36% of the mass is passing 25 μm.

TABLE II

| Size | microns | Weight | % Pass |
|---|---|---|---|
| 20 mesh | — | 0.00 | 100.0% |
| 40 mesh | — | 0.00 | 100.0% |
| 50 mesh | — | 0.00 | 100.0% |
| 70 mesh | 210 | 0.01 | 100.0% |
| 100 mesh | 150 | 0.02 | 100.0% |
| 140 mesh | 105 | 1.40 | 99.3% |
| 200 mesh | 74 | 2.58 | 98.0% |
| 270 mesh | 53 | 46.65 | 74.1% |
| 325 mesh | 44 | 23.29 | 62.3% |
| 400 mesh | 37 | 23.00 | 50.5% |
| 500 mesh | 25 | 28.35 | 36.0% |
| m500 mesh | 25 | 70.61 | 0.0% |

PZC Test

Figure 16:
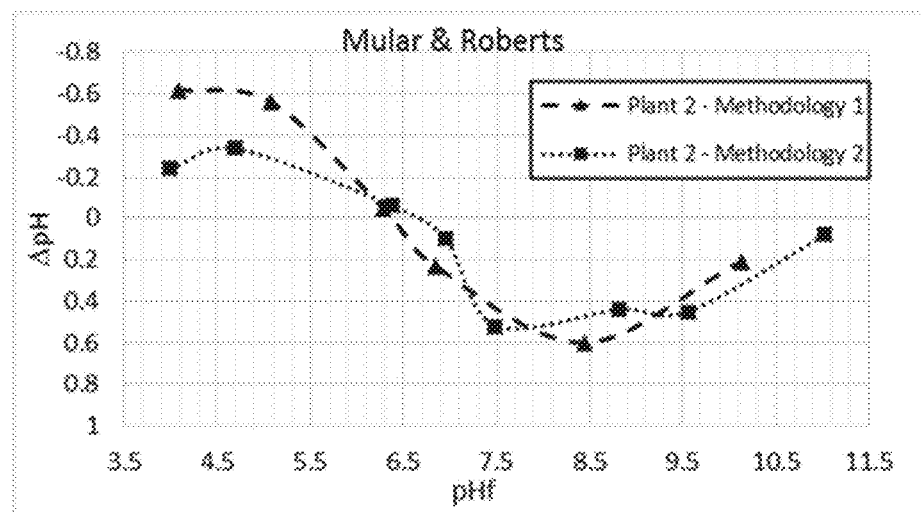
FIG. 16 is a plot of data as described in the Examples.
Figure 17:
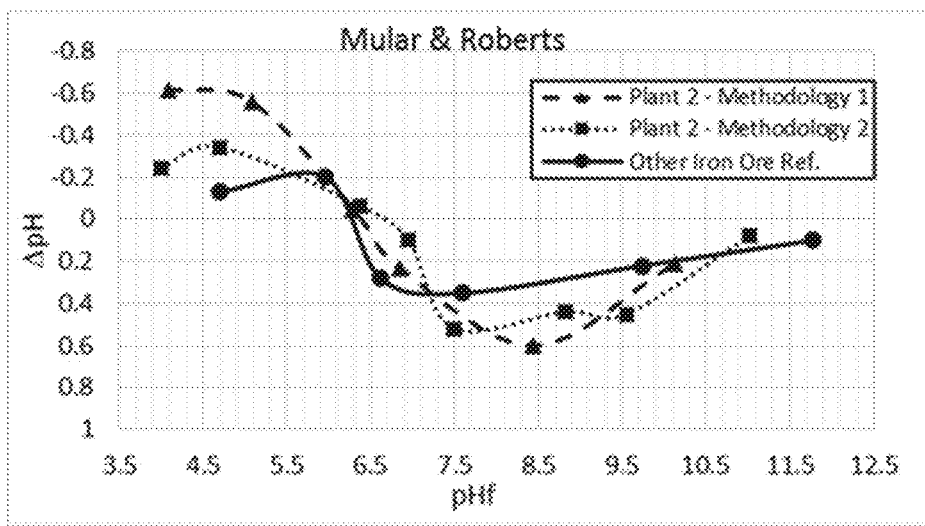
FIG. 17 is a plot of data as described in the Examples.

FIG. 16 shows the results for Mular and Roberts test, using the reagents described in the previous section (methodology 01) and another sets of reagents (methodology 02) in order to confirm the results. Both sets of reagents give the same result, the PZC is around pH 6.35. It is expected that above the PZC both quartz and hematite will have surface charged negatively, being the quartz strongly negative and hematite weakly negative. FIG. 17 shows a reference from an iron ore plant in Brazil.

Flotation Tests

Figure 18:
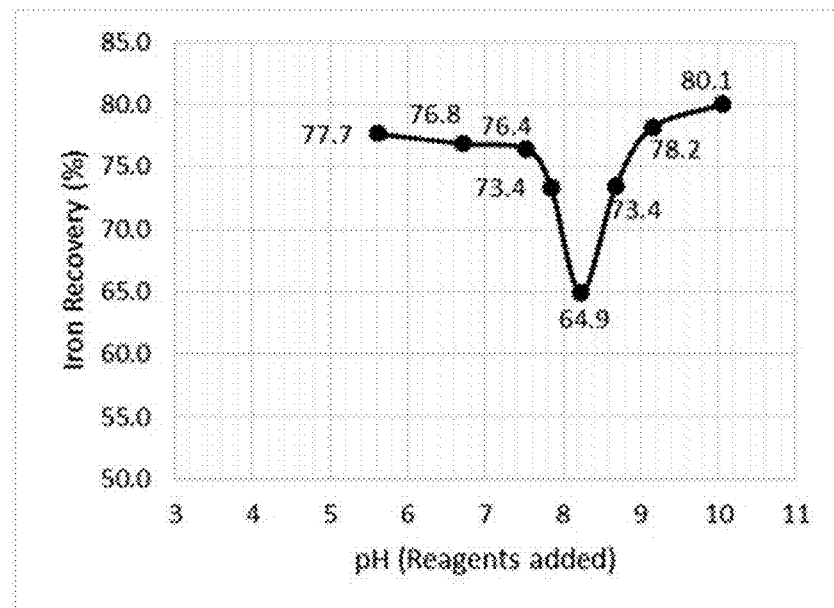
FIG. 18 is a plot of data as described in the Examples.
Figure 19:
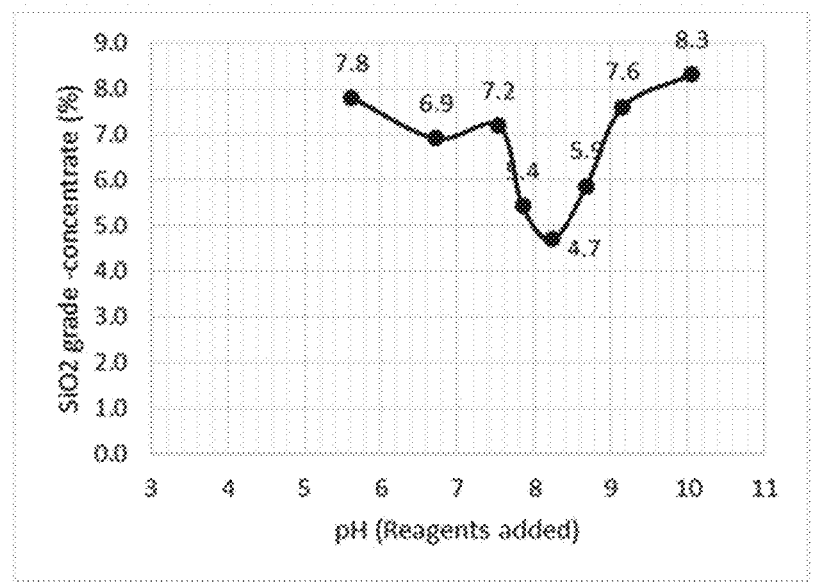
FIG. 19 is a plot of data as described in the Examples.

FIGS. 18 and 19 show the results in terms of iron recovery and SiO$_2$ in the concentrate vs pH. The results show that in very low and high pH the recovery is high but SiO$_2$ in the concentrate also is high, between pH 7.6 and 8.8 seems to have the better results in terms of SiO$_2$ in the concentrate being the peak around pH 8.

Figure 20:
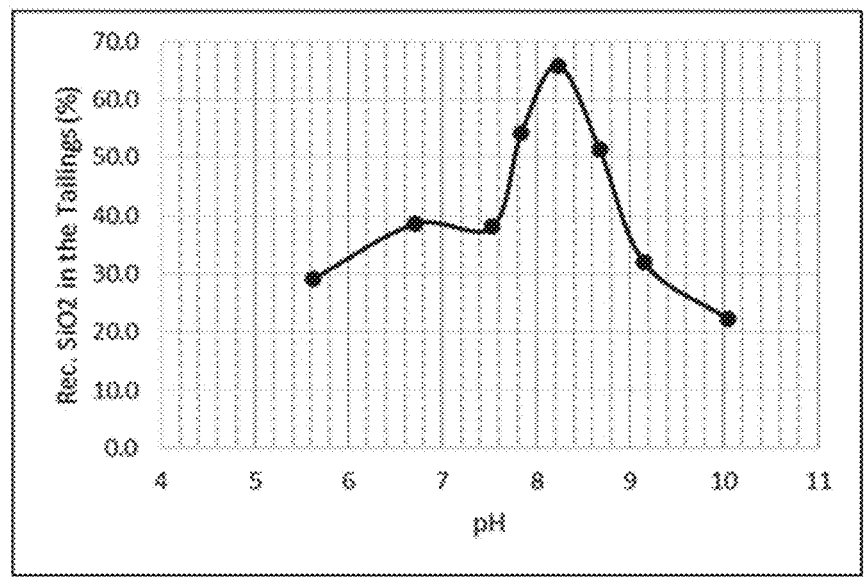
FIG. 20 is a plot of data as described in the Examples.
Figure 21:
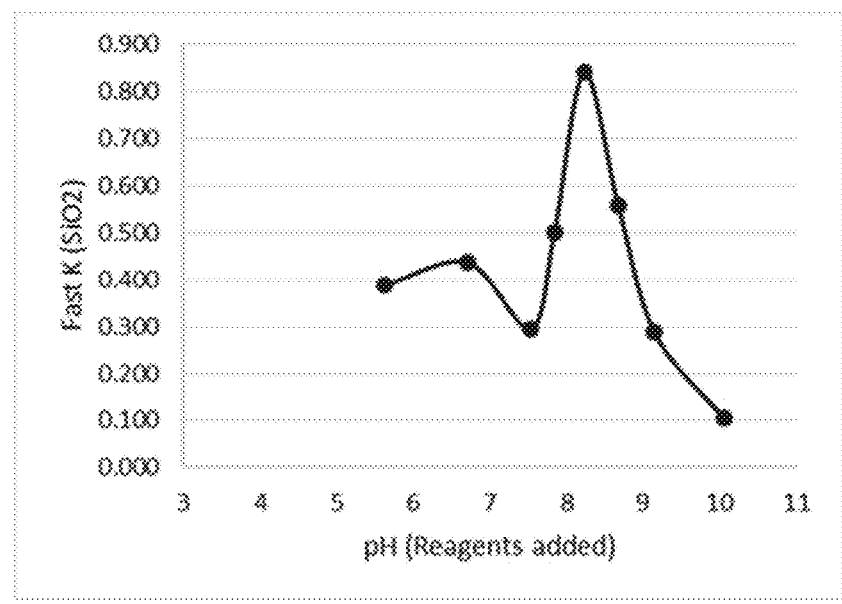
FIG. 21 is a plot of data as described in the Examples.

The Mular & Robert test showed a PZC at 6.3. At pH 8 both hematite and quartz are negatively charged with the quartz strongly negative and hematite weakly negative. That condition seems to favor the quartz flotation. (FIG. 20) A peak in the kinetic flotation also can be seen around pH 8, as shown in FIG. 21. It is important to note that the collector and frother dosages were kept the same during the pH investigation. Changes in the collector and frother dosages can affect the results in the sense of increase or decrease the flotation efficiency and alter the results seem in this study.

Figure 22:
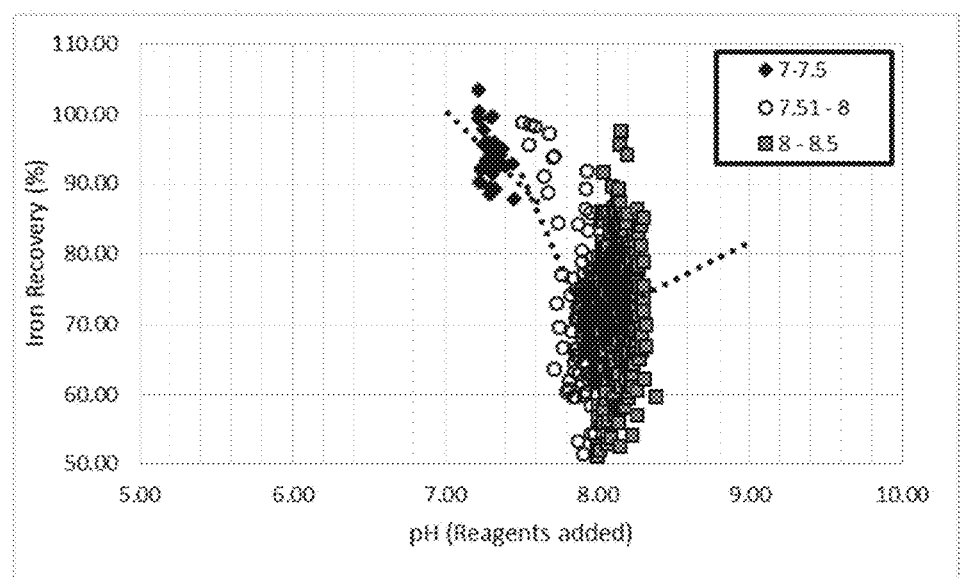
FIG. 22 is a plot of data as described in the Examples.
Figure 23:
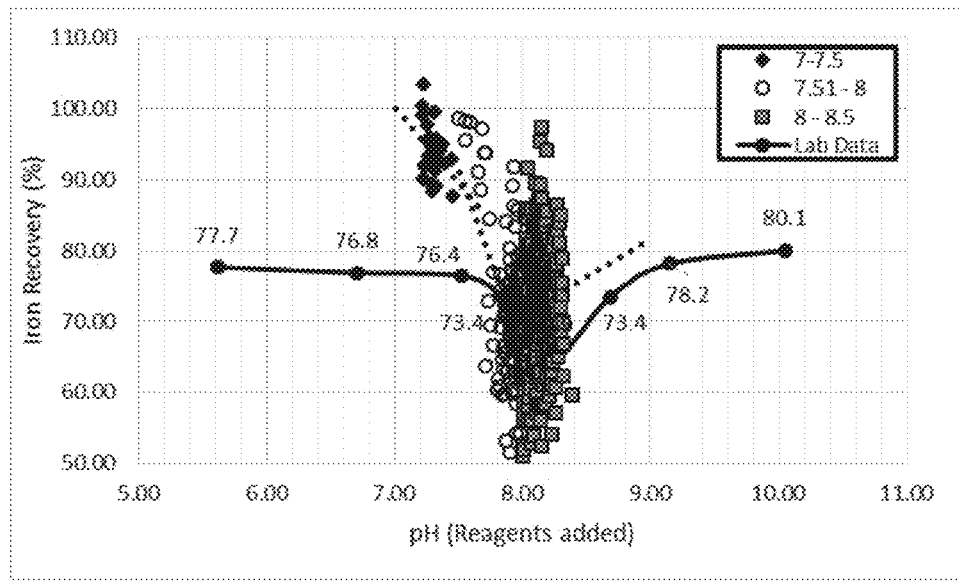
FIG. 23 is a plot of data as described in the Examples.

FIG. 22 shows data from Plant X after installing a pH meter on the flotation feed. The results present the same behavior seen in the lab test as shown in FIG. 23.

Conclusions

Plant X PZC was found to be around pH 6.3, which is in accordance with other iron ore reference. The pH around 8 gives the best floatability, consequently better chances to make grade, outside of the range 7.6 to 8.8 the recoveries are higher but SiO$_2$ in the concentrate is also higher.

90 ft Thickener UF Plant Y Starch Evaluation

Introduction

For the Starch project an extensive lab test plan was done considering the effect of many variables as pH, collector and starch type, dosages, etc. This investigation was done using a sample collected from Plant X flotation feed. The results of these studies would be used as base for implementation of starch at Plant X and Plant Y considering the flotation feed are very similar in both cases. One of the options for the Plant Y is to separate the flotation into Low and High silica flotation, in this case the 90 ft thickener UF that is a result of finisher tails from magnetic separators and scavenger WHIMS concentrate would go to a secondary grinding circuit followed by desliming with hydrocyclones and then flotation.

Procedures

The evaluation was done using two 90 ft thickener UF samples, the first sample with $SiO_2$ and Fe grades of 22.7% and 48.9% respectively and the other sample with $SiO_2$ and Fe grades of 18% and 52% respectively. For a better understanding the results will be discussed separately for each sample.

Results

PZC Test

The method of Mular and Roberts was used to determine the values of PZC for the feed sample. When an oxide is in contact with water, there occurs a redistribution of the ionic species in the solid/liquid interface and the result of that is the electric double layer. The mechanism of adsorption of the collector in the iron ore cationic reverse flotation using amines is mainly electrostatic interactions. Therefore, knowing the PZC and surface charges of the ore related with pH is of paramount importance.

Figure 24:
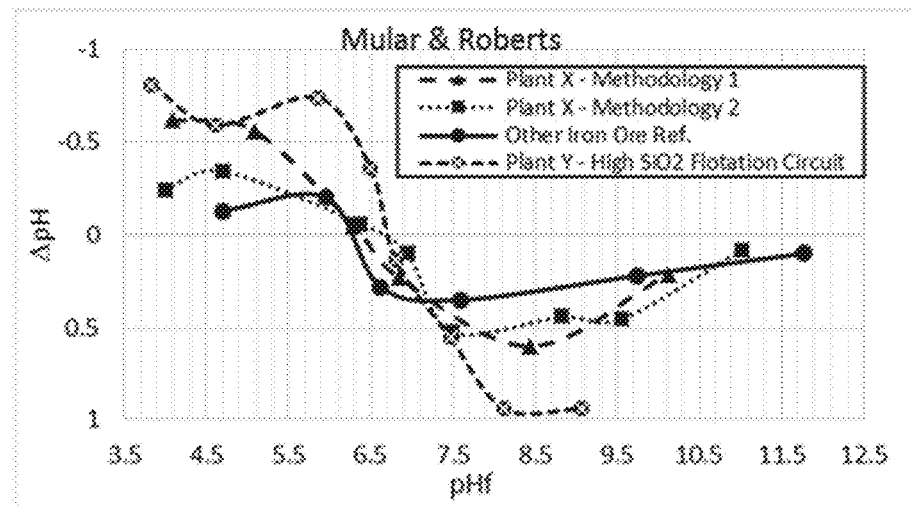
FIG. 24 is a plot of data as described in the Examples.

FIG. 24 shows the PZC of the low silica sample and high silica sample. There is a significant difference between the low and high silica samples in terms of PZC, the pH values are 6.35 and 6.96 respectively. These results support the option of having two flotation circuits (low and high silica circuit), enabling each circuit to be optimized to maximize Fe recovery and minimize silica in the concentrate.

Sample 01

Figure 25:
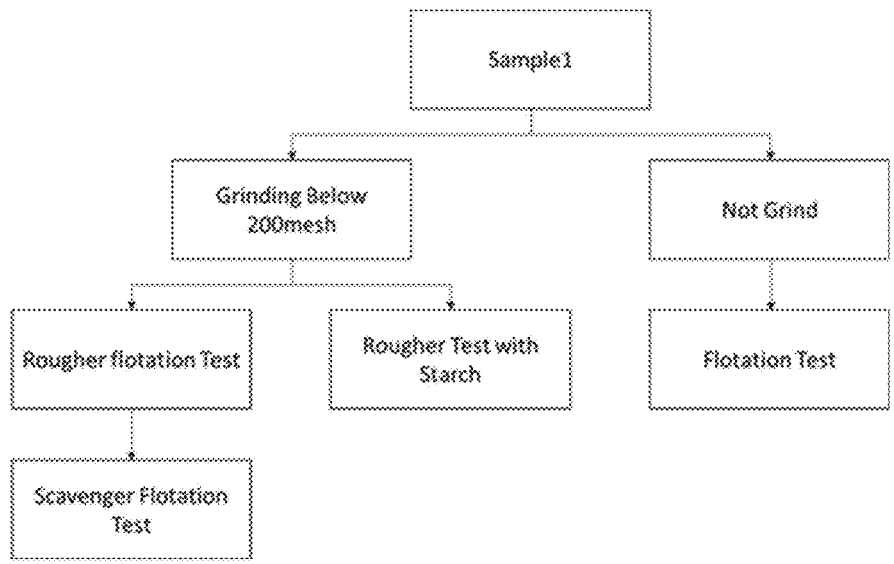
FIG. 25 is a diagram of the setup of an experimental test as described in the Examples.
Figure 26:
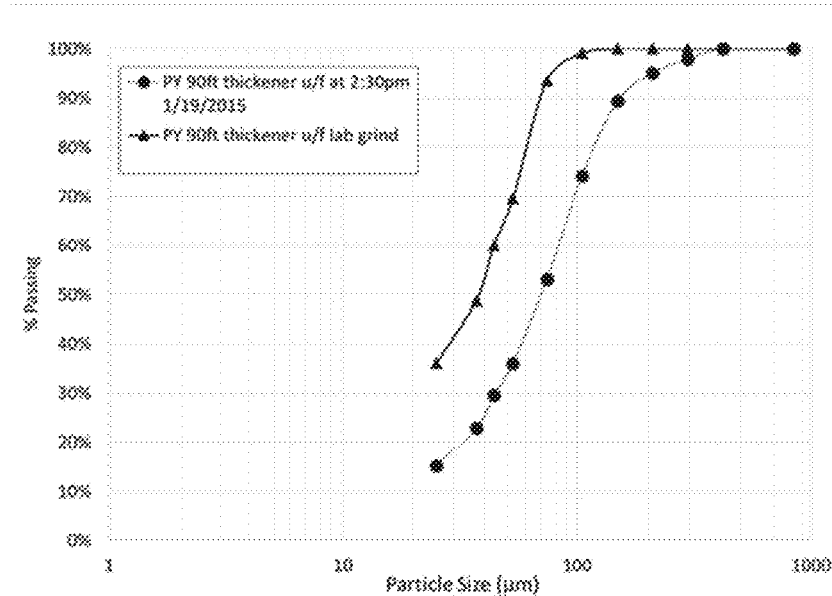
FIG. 26 is a plot of data as described in the Examples.

FIG. 25 shows the test summary for this sample. The PSD of the sample before and after grinding can be seen in the FIG. 26. The P80 before and after grinding is 118 μm and 61 μm. Table III shows that the head sample has Fe and $SiO_2$ grades of 49% and 22.6% respectively.

TABLE III

| | Assays | | | Average |
|---|---|---|---|---|
| Fe | 48.9% | 49.0% | 49.0% | 49.0% |
| SiO2 | 22.3% | 22.6% | 22.7% | 22.6% |

Flotation Test

The flotation test without sample grinding did not have a good performance. Based on a visual inspection, it was concluded that it did not work, so a decision was made to not assay the test.

Figure 27:
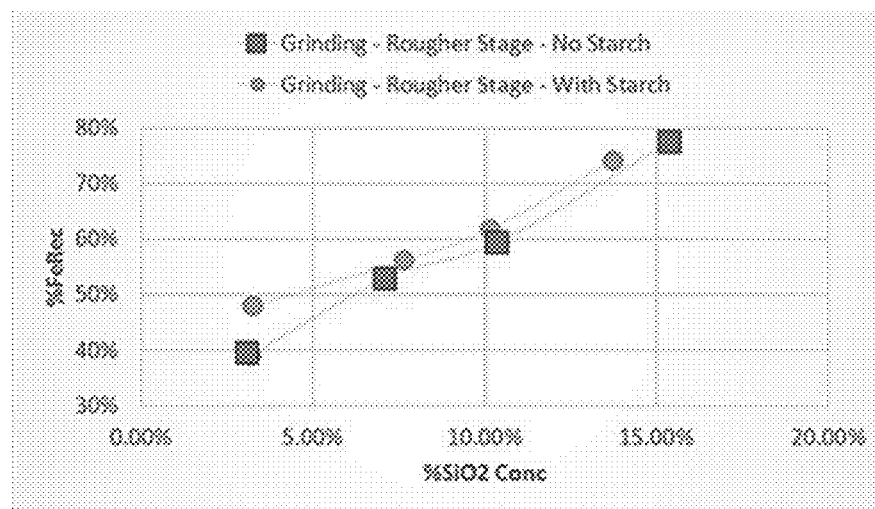
FIG. 27 is a plot of data as described in the Examples.

The comparison between the tests with starch and without starch can be seen in FIG. 27. Considering the $SiO_2$ in the concentrate below 5%, the starch test has improved the iron recovery around 20% comparing with the results without starch. The proper design of a flotation circuit depends on several parameters that include mineral composition, particle size distribution, reagents type, etc. Depending on these parameters, a flotation circuit can go from a conventional rougher/cleaner, scavenger circuit with conventional flotation cells to a mixed circuit of high volume cylindrical cells incorporating both forced air and self-induced air flotation machines. The flotation circuit can also incorporate grinding mills for optimum mineral liberation and hydrocyclones for slimes removal.

Figure 28:
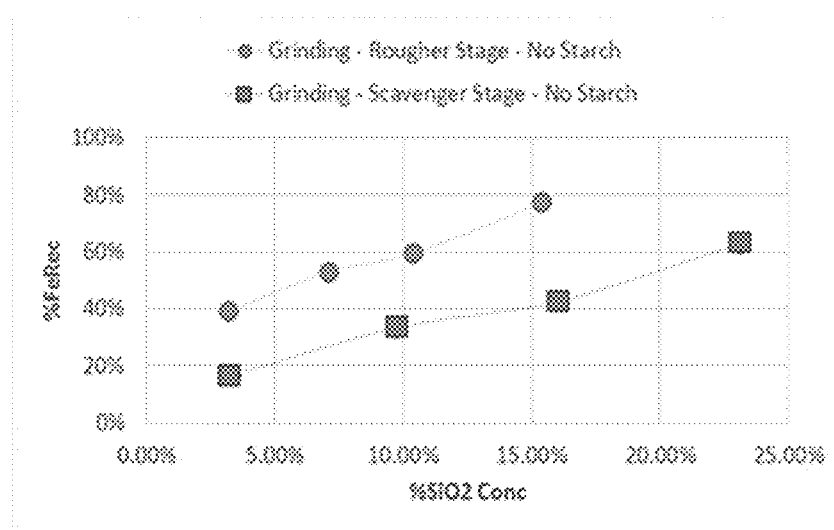
FIG. 28 is a plot of data as described in the Examples.

FIG. 28 show the test results with a stage of scavenger for the flotation. The results show that the material floats well and can reach good grades in the concentrate although this stage does not meet objectives for final concentrate. The main target for this phase is to improve the iron recovery as much as possible and return the concentrate to a rougher feed closing the circuit.

Sample 2

Figure 29:
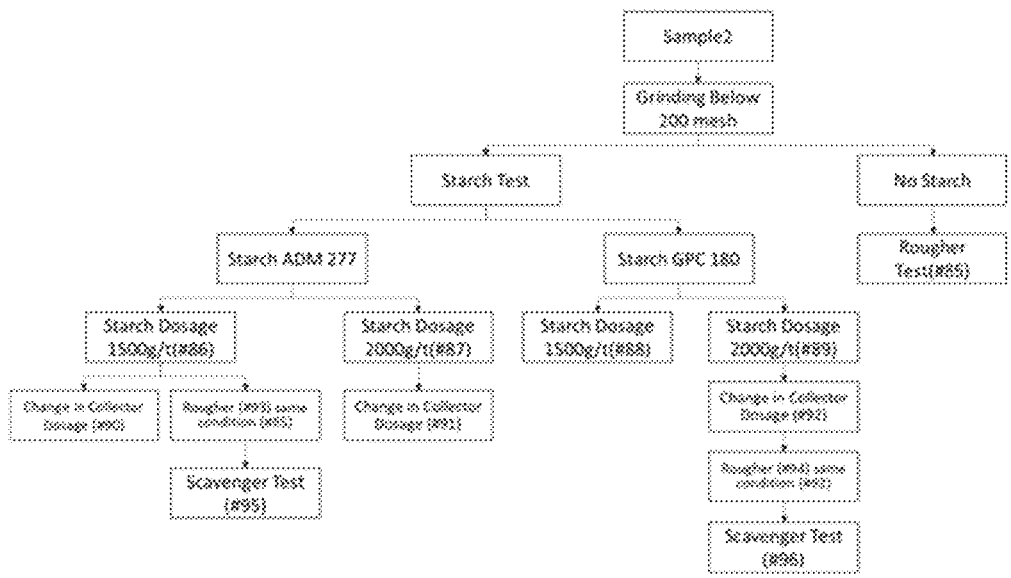
FIG. 29 is a diagram of the setup of another experimental test as described in the Examples.
Figure 30:
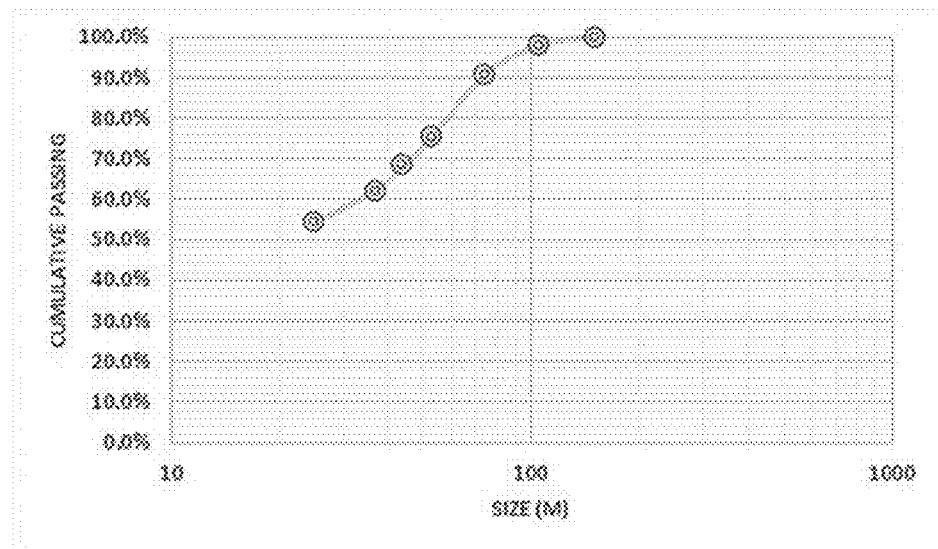
FIG. 30 is a plot of data as described in the Examples.

FIG. 29 shows the test summary for this sample and Table V shows in more details the flotation test plan. The PSD of the sample after grinding can be seen in the FIG. 30. The P80 after grinding is 58 μm. Table IV shows that the head sample has Fe and $SiO_2$ grades of 52% and 18.3% respectively.

TABLE IV

| | Assays | | | Average |
|---|---|---|---|---|
| Fe | 52.0% | 51.9% | 52.0% | 52.0% |
| SiO2 | 18.4% | 18.3% | 18.2% | 18.3% |

TABLE V

| | Description | | | | | | |
|---|---|---|---|---|---|---|---|
| Run | Starch dosage (g/t) | Collector dosage (#/t) | Frother dosage (#/t) | pH | Starch Type | Collector Type | Test Mass |
| 85 HS | | 0.68 | 0.13 | | | M100-7 | 716 |
| 86 HS | 1500 | 0.68 | 0.13 | 8.1 | ADM 028277 | M100-7 | 716 |
| 87 HS | 2000 | 0.68 | 0.13 | 8.1 | ADM 028277 | M100-7 | 716 |
| 88 HS | 1500 | 0.68 | 0.13 | 8.1 | GPC M180 | M100-7 | 716 |
| 89 HS | 1500 | 0.68 | 0.13 | 8.1 | GPC M180 | M100-7 | 716 |
| 90 HS | 2000 | 0.58 | 0.15 | 8.1 | ADM 028277 | M100-7 | 716 |
| 91 HS | 1500 | 0.58 | 0.15 | 8.1 | ADM 028277 | M100-7 | 716 |
| 92 HS | 2000 | 0.75 | 0.19 | 8.1 | GPC M180 | M100-7 | 716 |
| 93(86) | 1500 | 0.68 | 0.13 | 8.1 | ADM 028277 | M100-7 | 716 |
| 94(92) | 2000 | 0.75 | 0.19 | 8.1 | GPC M180 | M100-7 | 716 |
| 95(86) SCV | 2000 | 0.75 | 0.19 | NA | ADM 028277 | M100-7 | 717 |
| 96(92) SCV | 2000 | 0.75 | 0.19 | NA | GPC M182 | M100-7 | 718 |

Flotation Test

Figure 31:
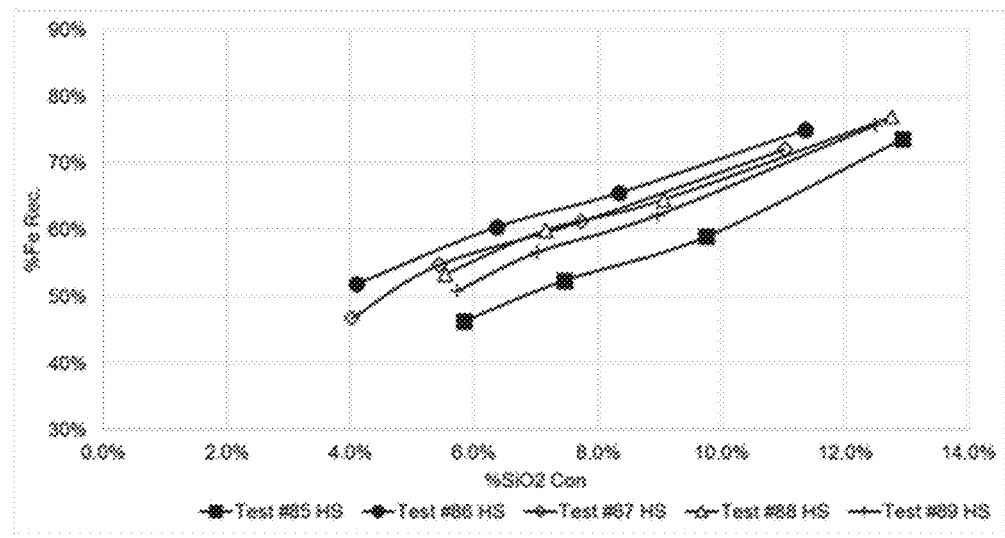
FIG. 31 is a plot of data as described in the Examples.

FIG. 31 shows the first 5 flotation tests. The conditions and starch types tested (ADM 277, a modified starch commercially available from Archer Daniels Midland Company (Decatur, Ill.) and GPC 180, a malodextrin commercially available from Grain Processing Corporation (Muscatine, Iowa)) were based on the knowledge gained in previous tests. The results show a huge increase in the iron recovery for both starch types. The use of ADM 277 improves the iron recovery and improves the selectivity as well. Lower $SiO_2$ grades on the concentrate were achieved using this starch.

Figure 32:
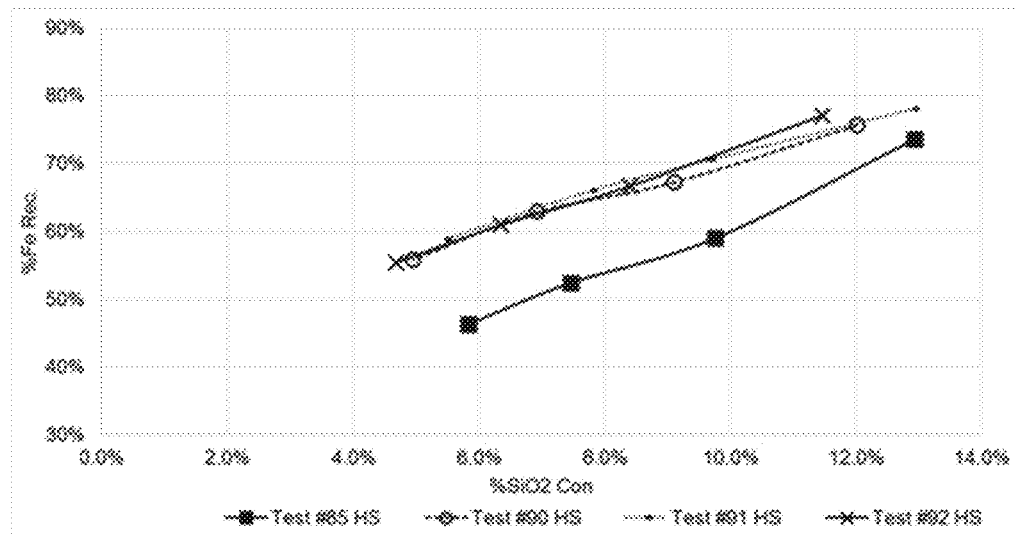
FIG. 32 is a plot of data as described in the Examples.

Based on the results presented in FIG. 31, a new set of conditions for the flotation tests were analyzed in an attempt to further improve the iron recovery and selectivity. For the further testing, different dosages of collector and frother were used. FIG. 32 shows the results from this new setup, which showed that the iron recovery improved and selectivity was kept the same. The results presented so far shows a huge potential for the starch application for the high silica flotation. There are improvements in iron recovery and selectivity as well.

Figure 33:
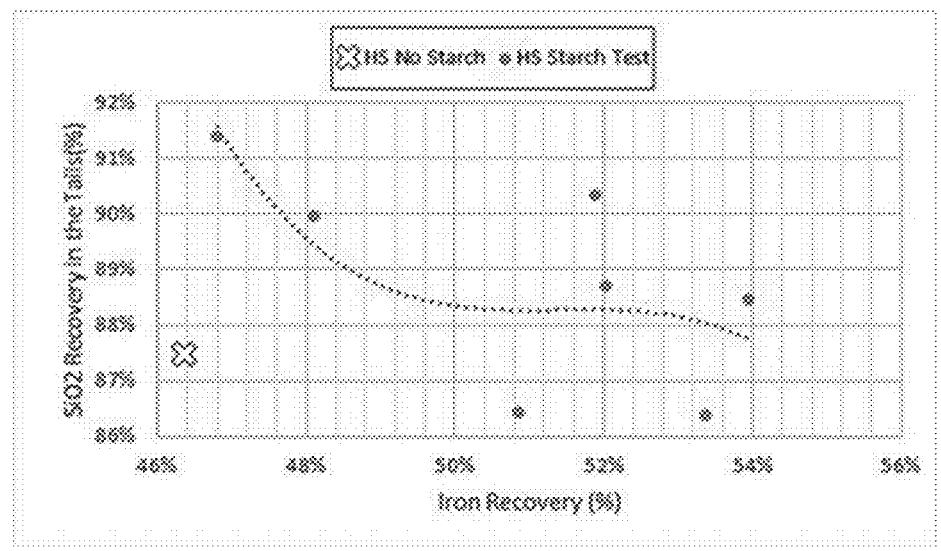
FIG. 33 is a plot of data as described in the Examples.
Figure 34:
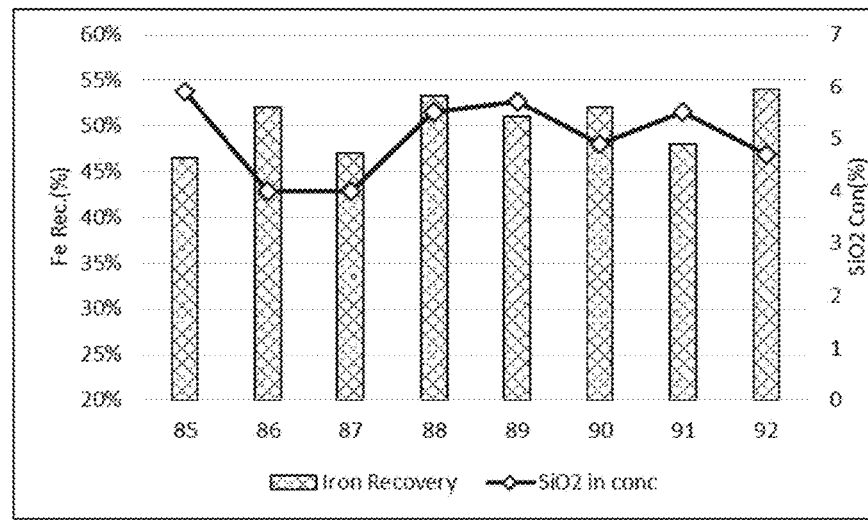
FIG. 34 is a plot of data as described in the Examples.

FIGS. 33 and 34 show all the results together confirming the superior performance of the starch tests in terms of iron recovery and selectivity.

Figure 35:
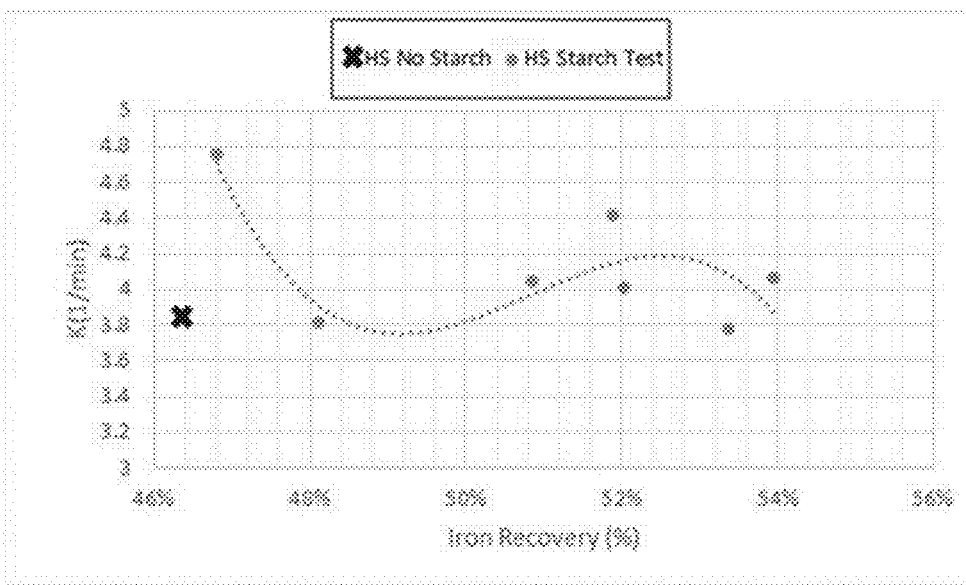
FIG. 35 is a plot of data as described in the Examples.

Other benefits of using starch can be seen in FIG. 35. FIG. 35 shows all the results in terms of kinetic constant and iron recovery. The results show that the starch also improves the kinetic for the flotation, which means, for an established flotation circuit, the need of less residence time that can be translated in more circuit capacity.

Figure 36:
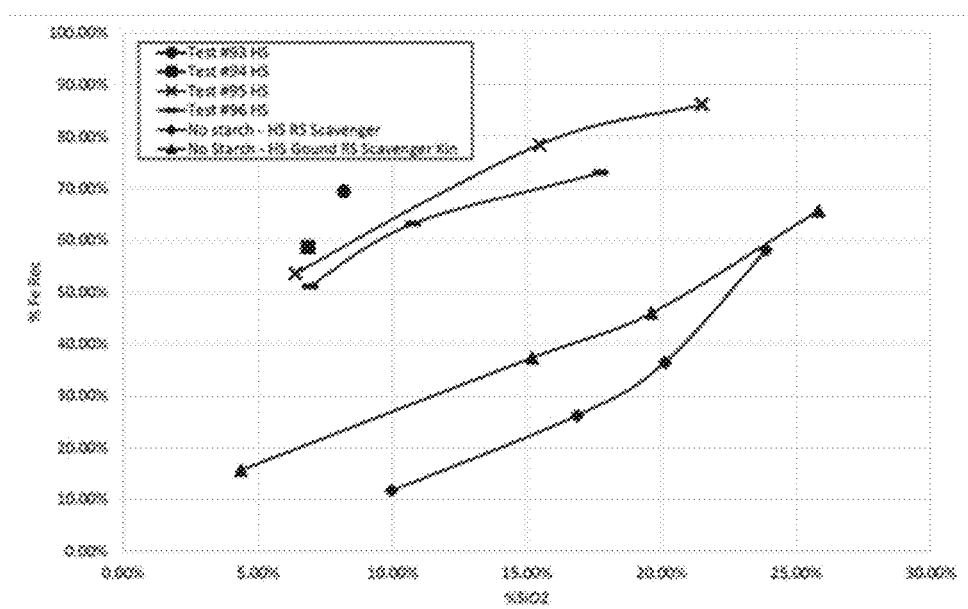
FIG. 36 is a plot of data as described in the Examples.

FIG. 36 shows the results for the scavenger stage with starch and compares that with results without starch. The gain in the iron recovery is huge as we can see. These results confirm the huge potential in gain in iron recovery and selectivity with the scavenger and starch stages. In terms of scavenger stages, it would be preferential to have 2 stages based on experience with other circuits and previous tests and simulations.

As will be appreciated by a person of ordinary skill in the art in view of the present disclosure, in one aspect of the disclosure there is provided a method for processing a treatment slurry stream that includes: (i) introducing into a first flotation cell a treatment slurry stream, the treatment slurry comprising a mineral assemblage that includes a first concentration of silica and a second concentration of at least one iron oxide; (ii) metering into the first flotation cell a collector and a frother; (iii) recovering a froth fraction from the first flotation cell; and (iv) recovering a sink material fraction from the first flotation cell; wherein the treatment slurry in the first flotation cell is maintained at a target pH of from 8.0 to 8.5; and wherein the sink material recovered from the first flotation cell comprises a silica concentration lower than the first concentration and an iron oxide concentrate having an iron concentration greater than the second concentration.

The present disclosure also contemplates all embodiments described herein wherein the collector comprises an amine, a diamine or a combination thereof. The disclosure further contemplates all embodiments described herein wherein the collector is metered into the first flotation cell at a rate sufficient to maintain the treatment slurry at the target pH. The disclosure still further contemplates all embodiments described herein wherein the frother comprises methyl isobutyl carbonol. The disclosure yet further contemplates all embodiments described herein wherein the frother comprises a mixture of an aliphatic alcohol, an ester and an ether.

The disclosure also contemplates all embodiments described herein wherein the methods further include metering a basic reagent into the first flotation cell at a rate sufficient to maintain the treatment slurry at the target pH. The disclosure further contemplates all embodiments described herein wherein the basic reagent comprises sodium hydroxide.

The disclosure also provides embodiments in which any of the embodiments disclosed above further includes conditioning the treatment slurry before introducing the treatment slurry stream into the first flotation cell. In one embodiment, the conditioning includes mixing a depressant into the treatment slurry. The disclosure also contemplates all embodiments described above wherein the depressant comprises a polysaccharide or comprises a starch material. In alternative forms of the above embodiments, the starch material comprises a starch material made by digesting starch using a caustic and wherein mixing the digested starch into the treatment slurry provides a mixture having a pH greater than 8.5. In still other forms of the above embodiments, the caustic comprises sodium hydroxide or potassium hydroxide or a mixture of the two types of caustic.

In other embodiments of the disclosure, any of the methods described above further includes, before introducing the treatment slurry stream into the first flotation cell, reducing the pH of the mixture to the target pH. In alternative embodiments of the methods described above, the reducing comprises metering an acid into the treatment slurry stream. In still other embodiments of the methods described above, the reducing comprises injecting $CO_2$ into the treatment slurry.

In still other embodiments of the disclosure, any of the methods described above further includes introducing one of the froth fraction or the sink material fraction into a second flotation cell. In yet other embodiments of the disclosure, any of the methods described above further includes introducing the froth fraction into a second flotation cell and introducing the sink material into a third flotation cell.

In another aspect, the present disclosure provides a method for reducing the pH of a treatment slurry stream prior to flotation that includes: (i) providing a treatment slurry comprising a mineral assemblage that includes at least one iron oxide, wherein the treatment slurry has a first pH; (ii) injecting $CO_2$ into the treatment slurry to reduce the pH of the treatment slurry to a second pH; and (iii) subjecting the treatment slurry to flotation. In one embodiment, the first pH is a pH of greater than 8.5.

In yet another aspect, the present disclosure provides a method for processing a treatment slurry stream that includes: (i) providing a treatment slurry comprising a mineral assemblage that includes a first concentration of silica and a second concentration of at least one iron oxide; (ii) conditioning the treatment slurry by mixing a depressant into the treatment slurry to provide a conditioned treatment slurry, wherein mixing the depressant into the treatment slurry provides a conditioned treatment slurry having a pH greater than 8.5; (iii) injecting $CO_2$ into the conditioned treatment slurry to reduce the pH of the conditioned treatment slurry to a target pH of from 8.0 to 8.5; (iv) introducing the conditioned treatment slurry into a first flotation cell; (v) metering into the first flotation cell a collector and a frother; (vi) recovering a froth fraction from the first flotation cell; and (vii) recovering a sink material fraction from the first flotation cell. In one embodiment of the method, the depressant comprises a starch material made by digesting starch using a caustic. In another embodiment, the conditioned treatment slurry in the first flotation cell is maintained at the target pH. In yet another embodiment, the sink material recovered from the first flotation cell comprises a silica concentration lower than the first concentration and an iron oxide concentrate having an iron concentration greater than the second concentration.

What is claimed is:

1. A method for processing a treatment slurry stream, comprising:
    introducing into a first flotation cell a treatment slurry stream, the treatment slurry comprising a mineral assemblage that includes a first concentration of silica and a second concentration of at least one iron oxide;
    metering into the first flotation cell a collector and a frother;
    recovering a froth fraction from the first flotation cell;
    recovering a sink material fraction from the first flotation cell;
    conditioning the treatment slurry before introducing the treatment slurry stream into the first flotation cell, wherein said conditioning comprises mixing a depressant into the treatment slurry, wherein said depressant comprises a starch material made by mixing starch with a caustic and wherein mixing the depressant into the treatment slurry provides a mixture having a pH greater than 8.5; and reducing the pH of the mixture before introducing the mixture into the first flotation cell, wherein said reducing comprises injecting $CO_2$ into the mixture;

wherein the sink material recovered from the first flotation cell comprises a silica concentration lower than the first concentration and an iron oxide concentration greater than the second concentration.

2. The method of claim 1 wherein the collector comprises an amine, a diamine or a combination thereof.

3. The method of claim 2 wherein the collector is metered into the first flotation cell at a rate sufficient to maintain the treatment slurry at the target pH.

4. The method of claim 1 wherein the frother comprises methyl isobutyl carbinol.

5. The method of claim 1 wherein the frother comprises a mixture of an aliphatic alcohol, an ester and an ether.

6. The method of claim 1, further comprising metering a basic reagent into the first flotation cell at a rate sufficient to maintain the treatment slurry at the target pH.

7. The method of claim 6 wherein the basic reagent comprises sodium hydroxide.

8. The method of claim 1 wherein the caustic comprises sodium hydroxide or potassium hydroxide or a mixture of the two types of caustic.

9. The method of claim 1 wherein said reducing further comprises metering an acid into the mixture.

10. The method of claim 1, further comprising introducing one of the froth fraction or the sink material fraction into a second flotation cell.

11. The method of claim 1, further comprising introducing the froth fraction into a second flotation cell and introducing the sink material into a third flotation cell.

* * * * *